US011640293B2

(12) United States Patent
Dreesen

(10) Patent No.: US 11,640,293 B2
(45) Date of Patent: May 2, 2023

(54) METHOD FOR DATA MIGRATION OF A POINTER ELEMENT IN THE COURSE OF DATA MIGRATION OF A PROGRAM STATE OF A CONTROL PROGRAM OF AN AUTOMATION SYSTEM

(71) Applicant: Beckhoff Automation GmbH, Verl (DE)

(72) Inventor: Ralf Dreesen, Rietberg (DE)

(73) Assignee: Beckhoff Automation GmbH, Verl (DE)

( * ) Notice: Subject to any disclaimer, the term of this patent is extended or adjusted under 35 U.S.C. 154(b) by 0 days.

(21) Appl. No.: 17/731,138

(22) Filed: Apr. 27, 2022

(65) Prior Publication Data

US 2022/0261237 A1     Aug. 18, 2022

Related U.S. Application Data

(63) Continuation of application No. PCT/EP2020/085797, filed on Dec. 11, 2020.

(30) Foreign Application Priority Data

Dec. 13, 2019   (DE) ...................... 10 2019 134 353.4

(51) Int. Cl.
  *G06F 8/656* (2018.01)
  *G06F 8/41* (2018.01)
(52) U.S. Cl.
  CPC .............. *G06F 8/656* (2018.02); *G06F 8/434* (2013.01)
(58) Field of Classification Search
  None
  See application file for complete search history.

(56) References Cited

U.S. PATENT DOCUMENTS 6,049,667 A    4/2000  Bates
6,085,203 A    7/2000  Ahlers et al.
(Continued)

FOREIGN PATENT DOCUMENTS

CN   110488738 A    11/2019
DE   19810802 A1    9/1999
(Continued)

OTHER PUBLICATIONS

Office Action dated Nov. 30, 2022 in connection with Chinese patent application No. 202080078086.3, 9 pages including English translation.

(Continued)

*Primary Examiner* — Philip Wang
(74) *Attorney, Agent, or Firm* — Dorsey & Whitney LLP

(57) ABSTRACT

A method for data migration of a pointer element in the course of data migration of a program state of a control program of an automation system comprises identifying the first pointer element and the second pointer element as pointer elements associated with each other via a first relation in a pointer-identifying step, and mapping the first pointer element to the second pointer element in a pointer migration step. The pointer migration step comprises identifying the first pointer object referenced by the first pointer element, identifying an object associated with the first pointer object as the second pointer object, determining an absolute memory address of the second pointer object, and writing the determined memory address of the second pointer object as a value of the second pointer element into the second pointer element.

15 Claims, 9 Drawing Sheets

(56) References Cited

U.S. PATENT DOCUMENTS

| | | | | |
|---|---|---|---|---|
| 6,347,396 | B1* | 2/2002 | Gard | G06F 8/656 707/999.01 |
| 2002/0120601 | A1* | 8/2002 | Elmendorf | G06F 8/656 |
| 2003/0177486 | A1* | 9/2003 | Bakke | G06F 8/656 717/169 |
| 2005/0114685 | A1* | 5/2005 | Blinick | G06F 8/65 713/1 |
| 2005/0114853 | A1* | 5/2005 | Glider | G06F 8/60 717/170 |
| 2007/0055964 | A1* | 3/2007 | Mirkazemi | G06F 8/41 717/118 |
| 2011/0224809 | A1* | 9/2011 | Graf | G06F 8/656 700/87 |
| 2013/0262843 | A1* | 10/2013 | Du | G06F 9/30145 712/227 |
| 2018/0113691 | A1* | 4/2018 | Gschwind | G06F 8/443 |
| 2018/0157437 | A1* | 6/2018 | Sandberg | G06F 12/0831 |

FOREIGN PATENT DOCUMENTS

| | | | |
|---|---|---|---|
| EP | 0764899 A1 | 3/1997 | |
| EP | 2365438 A1 * | 9/2011 | G06F 8/656 |
| WO | 2015020655 A1 | 2/2015 | |

OTHER PUBLICATIONS

International Search Report and Written Opinion dated Mar. 16, 2021 in connection with PCT/EP2020/085797, 18 pages including English translation.

International Preliminary Report on Patentability dated May 11, 2021 in connection with PCT/EP2020/085797, 37 pages including English translation.

Gupta , et al., Gupta, Deepak et al. "On-line Software Version Change Using State Transfer Between Processes," Software-Practice and Experience, vol. 23(9), Sep. 1993, pp. 949-964.

\* cited by examiner

METHOD FOR DATA MIGRATION OF A POINTER ELEMENT IN THE COURSE OF DATA MIGRATION OF A PROGRAM STATE OF A CONTROL PROGRAM OF AN AUTOMATION SYSTEM

CROSS-REFERENCE TO RELATED APPLICATIONS

This is a continuation of International Patent Application No. PCT/EP2020/085797, filed 11 Dec. 2020, entitled METHOD FOR DATA MIGRATION FOR A POINTER ELEMENT IN THE COURSE OF A DATA MIGRATION FOR A PROGRAM STATE OF A CONTROL PROGRAM OF AN AUTOMATION SYSTEM, which claims priority to German patent application DE 10 2019 134 353.4, filed 13 Dec. 2019, entitled VERFAHREN ZUR DATENMIGRATION EINES ZEIGERELEMENTS IM ZUGE EINER DATENMIGRATION EINES PROGRAMMZUSTANDS EINES STEUERPROGRAMMS EINES AUTOMATISIERUNGSSYSTEMS, each of which is incorporated by reference herein, in the entirety and for all purposes.

FIELD

The present application provides a method for data migration of a pointer element, which is performed in the course of data migration of a program state of a control program of an automation system.

BACKGROUND

In automation technology, subscribers of an automation system are usually controlled by a controller of the automation system by cyclically executing a corresponding control program. For each cycle in which the respective subscribers are controlled according to the respective control instructions of the control program, information describing the state of the automation system and the control program is extracted and stored by the controller. A so-called global state comprises the complete information necessary to reflect the state of the automation system and the control program. For example, a global state may comprise the variables, functions, databases, or other objects used in the control program. Furthermore, the global state may include information regarding the subscribers of the automation system or regarding processes running in the automation system.

Such a global state may be recreated after each control cycle has been completed, so that the current state of the automation system and the control program may be reflected at any time.

When the control program is executed again in a subsequent control cycle, the control program may refer back to the data stored in the global state and thus continue to control the automation system in the subsequent cycle based on the state of the automation system in the previous control cycle.

During operation of an automation system, situations often arise in which various parameters have to be readjusted or processes have to be changed or adjusted in order to achieve or guarantee an optimum or optimized operation of the automation system. In this context, it is often necessary during operation to replace a currently-running control program that is with a more up-to-date version in which the necessary adjustments are taken into account. In order to be able to avoid a restart of the automation system after the replacement and instead continue to operate the automation system in the current state, the current version of the control program must be able to access the information of the global state. This is the only way to ensure that the execution of the current version of the control program continues to control the automation system based on the state of the automation system in the last executed control cycle and that a complete restart of the automation system may be avoided. For this purpose, a data migration of the global state of the currently executed program to the global state of the current version of the control program must be performed, in which values of individual objects of the global state of the currently executed control program are mapped to corresponding objects of the global state of the current version of the control program. Thus, the information of the global state of the currently executed control program may be transferred to the global state of the current version of the control program.

A problem may occur if changes in the current version of the control program affect the information stored in the global state. For example, variables may have been renamed or data types of objects of the control program may have been changed in the current version. It is particularly problematic if the changes relate to pointer elements or pointer variables that reference objects of the control program that are relevant for the execution of the control program and the control of the automation system. Such changes or modifications relating to pointer elements may now prevent the current version of the control program from directly accessing the information of the global state, because after the modification the pointer elements are no longer able to reference the correct objects.

It is therefore necessary to adapt the information of the global state, including the pointer elements encompassed by the global state, to the current version of the control program, and the changes made therein in such a way that, if the adaptation is successful, the current control program may access the information of the global state and control the automation system in its current state.

SUMMARY

The application provides an improved method for data migration of a pointer element in the course of data migration of a program state of a control program of an automation system.

EXAMPLES

A method for data migration of a pointer element in the course of data migration of a program state of a control program of an automation system is provided, wherein a controller of the automation system comprises a first control program and a second control program, wherein the first control program comprises a first data element which describes a program state of the first control program and comprises at least one first pointer element of a first pointer type referencing a first pointer object, and wherein the second control program comprises a second data element which describes a program state of the second control program and comprises at least one second pointer element of a second pointer type which is configured to reference a second pointer object comprising:

identifying the first pointer element and the second pointer element as pointer elements associated with each other via a first relation in a first pointer-identifying step, mapping the first pointer element to the second pointer element in a pointer migration step, the pointer migration step comprising:

identifying the first pointer object referenced by the first pointer element in a first object-identifying step, identifying an object associated with the first pointer object as the second pointer object in a second object-identifying step, determining an absolute memory address of the second pointer object in a first address-determining step, and writing the determined absolute memory address of the second pointer object as the value of the second pointer element into the second pointer element in a first pointer-storing step.

This achieves the technical advantage that an effective method for data migration of a pointer element in the course of data migration of a program state of a control program of an automation system may be provided. With the method it may be achieved that a pointer element, which is part of a global state of a control program, may be mapped to an associated pointer element, which in turn is part of a global state of a further control program, in such a way that it is ensured that after mapping of the pointer element by the mapped pointer element the corresponding pointer object is referenced.

The provided method relates to an automation system controlled by a controller based on a first control program. The first control program comprises a first data element in which all information required for executing the first control program and for controlling the automation system is stored. The information of the first data element thus describes the global state or program state of the first control program, wherein the global state in turn comprises information on the state of the automation system controlled by the first control program.

The first data element comprises at least one pointer element that references a pointer object. In the following, a pointer element is a pointer variable that references a pointer object. A pointer object may in this context be a data object of the first control program. Alternatively, the pointer object may be a data object that is not an object of the first control program.

In addition, the automation system controller comprises a second control program, which in turn comprises a second data element in which information relating to the second control program is stored. The second control program is an updated version of the first control program and a possible replacement of the first control program for controlling the automation system. The second data element of the second control program again comprises a second pointer element arranged to reference a second pointer object. The second pointer object may be a data object of the second control program. Alternatively, the second pointer object may be a data object that is not an object of the second control program.

The provided method is embodied to transfer a value of the first pointer element, in which a memory address of the first pointer object referenced by the first pointer element is stored, to the second pointer element in such a way that after transfer the second pointer object is referenced by the second pointer element, i.e. referred to by the second pointer element. Here it is assumed that the first pointer object and the second pointer object are associated with each other via a relation. The first pointer object and the second pointer object may refer to each other via a relation that establishes a relationship between the first pointer object and the second pointer object if the first pointer object in the first control program and the second pointer object in the second control program have the same meaning or identity.

The provided method has the effect that after a successful data migration, i.e. a transfer of the information of the first data element to the second data element, a referencing of the second pointer object by the second pointer element corresponds to a referencing of the first pointer object by the first pointer element.

For this purpose, a first relation between the first pointer element and the second pointer element is identified in the first pointer-identifying step. The first relation between the first pointer element and the second pointer element implies that the first pointer element in the first control program has the same meaning, role or function as the second pointer element in the second control program. In the simplest case of the first relation, the first pointer element in the first control program and the second pointer element in the second control program describe an identical pointer variable of the same variable type and the same meaning. The aim of the present method in this case is to ensure, by mapping the value of the first pointer element to the second pointer element accordingly, that after successful mapping the second pointer element references a data object that has a meaning, role or function in the second control program that corresponds to the meaning, role or function of the first pointer object in the first control program.

For mapping the first pointer element to the second pointer element in a pointer migration step, the first pointer object referenced by the first pointer element is identified in a first object-identifying step. In a second object-identifying step, an object associated with the first pointer object is identified as the second pointer object. The second pointer object is a data object that may be referenced by the second pointer element. The association between the first pointer object and the second pointer object implies that the first pointer object in the first control program and the second pointer object in the second control program perform an identical function or role. The simplest association between the first pointer object and the second pointer object is when the first pointer object in the first control program and the second pointer object in the second control program are identical. In this case, it is thus guaranteed that the first pointer object and the second pointer object reference identical objects in the respective control programs after migration according to the method described above. In general, a first pointer object is associated with a second pointer object if they are related to each other, i.e. the information content of the first pointer object may be transferred to the second pointer object during a corresponding data migration.

After identifying the second pointer object as a data object associated with the first pointer object, a first address-determining step determines an absolute memory address of the second pointer object.

Subsequently, the determined absolute memory address of the second pointer object is stored in the second pointer element in a first pointer-storing step. With the mapping of the first pointer element to the second pointer element completed in this way, it is achieved that the second pointer element references the object associated with the first pointer object as the second pointer object. Thus, two associated data objects are referenced by the first pointer element in the first control program and by the second pointer element in the second control program, each of which fills identical meanings, roles, or functions in the first control program and in the second control program, and in the simplest case are identical data objects.

The first pointer element and the second pointer element may be associated with each other via a first relation, e.g. if the first pointer element and the second pointer element are named the same in the first control program and in the second control program. Alternatively, pointer elements may be associated with each other that are identically indexed elements of two variables of a field type that are also related to each other. Furthermore, pointer elements may be associated components of two variables of a compound type. Furthermore, the first relation between the first pointer element and the second pointer element may be achieved by explicitly defining the relation in the second control program. Alternatively, the relation may be embodied as additional information to the control program and may be due to the application of a refactoring tool in a programming environment. If both pointer elements are not identically named, an explicit statement in the second control program describing a relation between the first pointer element and the second pointer element may be used to achieve a corresponding relation. Furthermore, a first relation between the first pointer element and the second pointer element may be generated if a refactoring tool was used for renaming the second pointer element in the second control program when the two pointer elements were named differently.

The first pointer object may be arranged in the first data element and the second pointer object may be arranged in the second data element. Alternatively, the first pointer object and/or the second pointer object may each be arranged outside of the first data element or the second data element, respectively, but in the memory of the controller.

The first data element may be structured as a complex data structure and comprise a plurality of data objects describing the program state of the first control program or the global state of the first control program and the automation system, respectively. Preferably, the first data element may comprise the data type of a composite type and comprise a plurality of first data sub-elements. The plurality of data sub-elements, each of which is an object of the first control program, may also be of a composite type and may in turn comprise a plurality of components. The components may in turn have different data types, e.g. composite types, field types, scalar types, or the like. There are no limits imposed by the provided method for nesting data sub-elements of a compound type, the components of which are in turn objects of a compound type and likewise have components which are in turn of a compound type. Alternatively, the first data sub-elements may be of a field type and each have a plurality of elements, which in turn may have different data types. Alternatively, the first sub-elements may be scalar types.

Program state and global state are used synonymously in the following.

Similarly, the second data element may be structured as a complex data structure and may comprise a plurality of objects describing the global state of the second control program. Preferably, the second data element may be of a composite type and may comprise a plurality of second data sub-elements, which in turn are objects of the second control program and may also be of a composite type and may in turn comprise a plurality of components. The components may in turn be of various data types, e.g. composite types, field types, scalar types, pointer types, or the like. Alternatively, the second data sub-elements may be of a field type and may each have a plurality of elements, which in turn may have different data types. Alternatively, the second data sub-elements may be scalar types. No limits are set by the method for a nesting of data sub-elements of a compound type, the components of which are in turn objects of a compound type and also have components which are in turn of a compound type.

The first pointer object and the second pointer object, that is, the data objects referenced by the first pointer element and the second pointer element, may be of one of the data types of the data sub-elements mentioned above. In addition, the first pointer object and the second pointer object may be a component of a compound type or an element of a field type. In that case, the respective pointer element references the corresponding component or the corresponding element.

The first data element and the second data element are embodied as contiguous objects and are stored in different memory areas of the memory of the controller. Within the memory, the first data element and the second data element each occupy a contiguous memory area. Within the memory area of the first data element and the memory area of the second data element, no unused gaps exist and the respective objects of the first data element and the second data element are stored closely adjacent to each other in the respective memory areas. This does not affect gaps that are merely technical (padding), which are e.g. caused by alignment of data (alignment) and are motivated by the processor. In so-called "natural alignment", an N byte data may only be loaded from a memory location which is divisible without remainder by N, wherein N is a power of two. Apart from the alignment, the data is arranged as densely as possible.

In the following, objects are data objects of a control program and may also have a complex data structure and comprise complex information content. In addition, the objects may e.g. be of any data type, which in turn may contain sub-objects of any data type (e.g. as components or elements) and may be nested in any way. The global state is formed by the objects encompassed by the first data element and comprises all information required for controlling the automation system.

In the following, a data migration is a transfer of data from a first memory area to a second memory area. During a data migration of the program state of the first control program to the program state of the second control program, values of the objects of the first data element are read and transferred to corresponding objects of the second data element. Thus, the global state of the first control program described by the first data element may be transferred to the second data element. The second control program, which is an updated version of the first control program, may thus access the global state of the first control program after successful data migration, since after successful data migration the global state of the second control program corresponds or at least partially corresponds to the global state of the first control program or at least partially comprises the information of the global state of the first control program. This allows for the automation system to be controlled on the basis of the second control program, taking into account the global state of the first control program. A data migration of the global state of the first control program comprises a transfer of the pointer elements contained in the first data element to corresponding pointer elements in the second data element.

An absolute memory address of an object is in the following a memory address in the memory at which the respective object is stored and by which the respective object may be referenced. Absolute memory address and memory address are used synonymously in the following.

BRIEF DESCRIPTIONS OF THE DRAWINGS

The invention is described in more detail with reference to the accompanying figures, which show:

DETAILED DESCRIPTION

Figure 1:
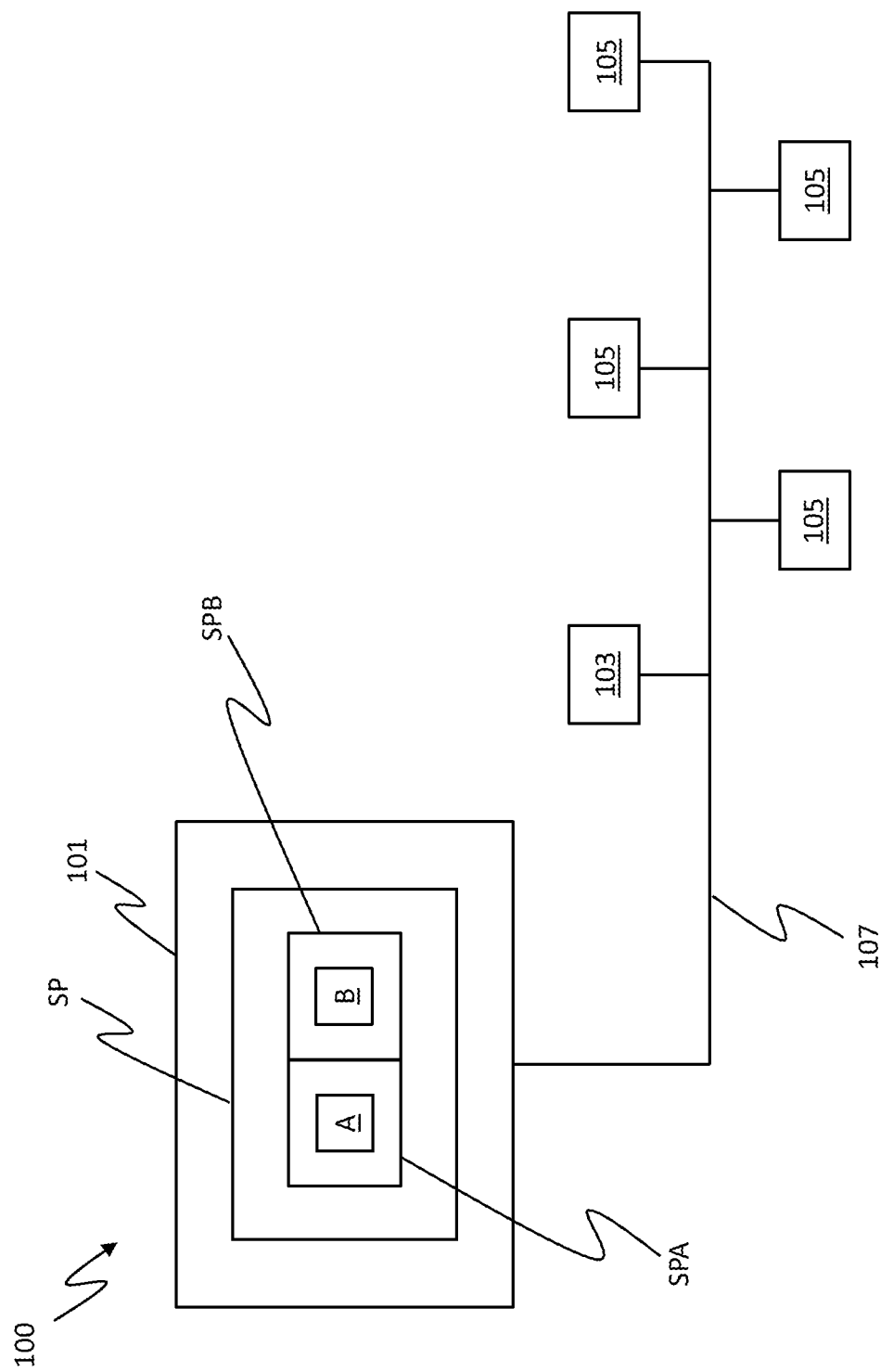
FIG. 1 is a schematic depiction of an automation system according to an example.

According to an example, the first data element is stored in a first memory area and the second data element is stored in a second memory area of the controller, wherein the first data element comprises at least one first data sub-element, wherein the second data element comprises at least one second data sub-element associated with the first data sub-element via a second relation, wherein the first data sub-element corresponds to the first pointer object and is referenced by the first pointer object, wherein the second data sub-element corresponds to the second pointer object, and wherein the pointer migration step comprises:

determining a first relative memory address of the first data sub-element in a first pointer-address-determining step, wherein by the first relative memory address a memory address of the first data sub-element within the memory area of the first data element relative to a first memory location of the first data element is described, determining a second relative memory address of the second data sub-element in a second pointer-address-determining step, wherein by the second relative memory address a memory address of the second data sub-element within a memory area of the second data element relative to a first memory location of the second data element is described, and determining a second absolute memory address of the second data sub-element on the basis of the second relative memory address of the second data sub-element and the first memory location of the second data element in the first address-determining step.

This achieves the technical advantage of providing an effective method for data migration of a pointer element, wherein the pointer element references a pointer object within a global state of a control program. The method in said example refers to the case in which the first data element and the second data element are each of a composite type data type, and each comprises a plurality of objects. The objects of the first data element are defined as first data sub-elements and the objects of the second data element are defined as second data sub-elements. The first data sub-elements and the second data sub-elements are each data objects of the first control program and the second control program, and may each be of the data type of a compound type, a field type, a scalar type, or a pointer type.

The first data element comprises at least one first data sub-element and the second data element comprises at least one second data sub-element. The first data sub-element and the second data sub-element are associated with each other via a second relation. They may be associated if the first and second data sub-elements are identically named or a corresponding relation is explicitly defined in the second control program. Alternatively, a second relation may be defined in a definition associated with the second control program through the use of a refactoring tool.

Furthermore, the first pointer object corresponds to the first data sub-element of the first data element, such that the first pointer element references the first data sub-element of the first data element. Similarly, the second data sub-element matches the second pointer object such that the second pointer element is a pointer to the second data sub-element. The method in said example has the effect that the second pointer element is provided with the memory address of the second data sub-element, so that the second pointer element references the second data sub-element as a second pointer object. Since the first data sub-element and the second data sub-element are associated with each other, after successful transmission, the first pointer element and the second pointer element reference corresponding data objects of the first control program and the second control program.

At the point in time before the provided method is carried out, the absolute memory addresses of the objects of the second data element are unknown. Alternatively, the absolute memory addresses of the objects of the second data element may be derived. The second data element is stored as a complex data structure comprising a plurality of data sub-elements or a plurality of data objects in a second memory area of the controller of the automation system. The second data element is stored as a complex data structure, in particular as a composite type, in the form of a contiguous object in the second memory area, so that the memory area occupied by the second data element is configured as a contiguous memory area without unoccupied gaps. In particular, the second data element may be a complex/structured datum of a composite type, with consecutive components in memory (and gaps due to memory alignment, if any).

The absolute memory addresses of the individual objects of the second data element are unknown at the time of storage in the second memory area of the second data element, or the absolute memory addresses are unknown at the time of generating the migration code. The absolute addresses are known only after it has been determined, e.g. by the memory management of a processor of the control unit or a unit of the controller controlling a runtime of the execution of one of the control programs, at which location of the memory the second data element starts. The relative addresses of the sub-elements, on the other hand, are known at the time of the generation. A structure within the second data element describing how the individual objects of the second data element are arranged relative to each other in the second data element is known. Furthermore, a first memory location of the second data element is known, by which the first absolute memory address of the memory area occupied by the second data element in the second memory area is identified.

The first memory location of the first data element is the memory location with the lowest memory address within the memory area occupied by the first data element in the first memory area. The first memory location of the first data element thus limits the memory area occupied by the first data element in the first memory area.

Similarly, the first memory location of the second data element is the memory location with the lowest memory address within the memory area occupied by the second data element in the second memory area. The first memory location of the second data element thus limits the memory area occupied by the second data element in the second memory area.

In general, a memory location is hereinafter a memory location or memory unit in the memory in which an object may be at least partially stored. Each memory location is provided with a memory address which, however, may be unknown in the method.

Since the absolute memory address of the second data sub-element as a second pointer object referenced by the second pointer element is unknown, the method according to the described example effects a determination of the absolute memory address of the second data sub-element by determining of a relative memory address of the second data sub-element within the second data element. After determining the relative memory address of the second data sub-element within the second data element, an absolute memory address of the second data sub-element may be determined via the known absolute memory address of the first memory location of the second data element.

For this purpose, a first relative memory address of the first data sub-element in the first data element is determined in a first pointer-address-determining step on the basis of a value of the first pointer element and an absolute memory address of the first data element. Here, the first relative memory address of the first data sub-element describes a memory address within the memory area of the first data element relative to the first memory location of the first data element. The first relative memory address thus describes the memory address within the memory area of the first data element relative to the first memory location of the first data element, which is occupied by the first data sub-element in the first data element, and which is referenced by the first pointer element.

Subsequently, a second relative memory address of the second data sub-element is determined in a second pointer-address-determining step. Analogously, the second relative memory address corresponds to a memory address of the second data sub-element within the memory area of the second data element relative to a first memory location of the second data element.

For this purpose, the second relation between the first data sub-element and the second data sub-element is taken into account to identify the object of the second data element to be referenced by the second pointer element after data migration.

On the basis of the determined second relative memory address of the second data sub-element and the first memory location of the second data element, an absolute memory address of the second data sub-element is determined in a first address-determining step.

By the association according to the second relation between the first data sub-element and the second data sub-element, the second data sub-element may be used to identify the object of the second data element which is to be referenced by the second pointer element after data migration. By knowing the internal structures of the first data element and the second data element, a second relative memory address of the second data sub-element in the memory area of the second data element may be determined using a determined relative memory address of the first data sub-element. Taking into account the second relative memory address of the second data sub-element and the known absolute memory address of the first memory location of the second data element, an absolute memory address of the second data sub-element may be determined. This is the value for the second pointer element and allows for the second pointer element to correctly reference the second data sub-element as a second pointer object.

According to an example, the pointer migration step comprises:

determining a first relative pointer address of the first pointer element in a third pointer-address-determining step, wherein with the first relative pointer address of the first pointer element a memory location referenced by the first pointer element within the memory area of the first data element relative to the first relative memory address of the first data sub-element is described, determining, based on the first relative pointer address, a second relative pointer address of the second pointer element in a fourth pointer-address-determining step, wherein by the second relative pointer address of the second pointer element a memory location within the memory area of the second data element is determined relative to the second relative memory address of the second data sub-element, and wherein the second relative pointer address in relation to the second data sub-element corresponds to the first relative pointer address in relation to the first data sub-element, and determining an absolute memory address of the second data sub-element based on the second relative pointer address, the second relative memory address of the second data sub-element, and the first memory location of the second data element in the second memory area in the first address-determining step.

This achieves the technical advantage of providing precise data migration of a pointer element by achieving an absolute memory address of a pointer object to be referenced via determining a relative memory address of a data object within a complex data structure. Furthermore, by using relative addresses, data sub-elements may be considered in an isolated manner, which in turn allows code to be reused, thereby reducing the code required for pointer migration.

In the third pointer-address-determining step, a first relative pointer address of the first pointer element is determined. The first relative pointer address of the first pointer element describes a memory location referenced by the first pointer element within the memory area of the first data element relative to the first memory address of the first data sub-element. The pointer address of the first pointer element describes an absolute memory address within the memory area of the first data element. In the third pointer-address-determining step, this absolute memory address of the first pointer element is converted into a first relative pointer address of the first pointer element by setting the absolute memory address of the first pointer element in relation to the first relative memory address of the first data sub-element.

Based on the first relative pointer address, a second relative pointer address of the second pointer element is determined in a fourth pointer-address-determining step. The second relative pointer address of the second pointer element describes a memory location within the memory area of the second data element relative to the second relative memory address of the second data sub-element. Within the second data element, the second relative pointer address describes a memory location that corresponds to the memory location described by the first relative pointer address in the first data element. The first relative pointer address within the first data element and the second relative pointer address within the second data element thus describe two memory addresses of equal significance in relation to the first data element and the second data element, respectively.

Based on the second relative pointer address, the second relative memory address of the second data sub-element and the first absolute memory address or the first memory location of the second data element, an absolute memory address of the second data sub-element is determined in the first address-determining step. The memory location within the memory area of the second data element described by the second relative pointer address may be converted to an absolute memory address of the second data sub-element in the second memory area, taking into account the second relative memory address of the second data sub-element to which the second relative pointer address refers and the absolute memory address of the first memory location of the second data element in the second memory area.

By taking into account the first relative pointer address and the second relative pointer address, it may be achieved that a memory address referenced by the first pointer element within a pointer object, wherein the memory address referenced by the pointer element differs from the first memory location of the respective referenced pointer object, may be transferred to a corresponding memory address within the memory area of the second data element, so that it may be ensured that the second pointer element corresponding to the first pointer element references a memory address that differs from the first memory location of the respectively referenced pointer object. This allows pointers to be migrated that do not reference the first memory location of the referenced pointer object but point into a pointer object.

According to an example, the pointer migration step comprises:
  if the first data sub-element and the second data sub-element are each of a composite type, if the first data sub-element comprises at least a first component, if the second data sub-element comprises at least a second component, if the first component and the second component are associated via a third relation, and if the first component is referenced by the first pointer element,
  determining, on the basis of the first relative pointer address, a first relative component address of the first component in a first component-address-determining step, wherein by the first relative component address a memory address in the memory area of the first data element of the first component is described relative to the first relative memory address of the first data sub-element,
  determining, on the basis of the first relative component address, a second relative component address of the second component of the second data sub-element in a second component-address-determining step, wherein the second relative component address describes a memory address in the memory area of the second data element of the second component relative to the second relative memory address of the second data sub-element, and
  determining an absolute memory address of the second component of the second data sub-element on the basis of the second relative component address, the second relative memory address of the second data sub-element, and the first memory location of the second data element in the second memory area in the first address-determining step.

This achieves the technical advantage of providing a precise method for data migration of a pointer element, in which the pointer element to be migrated references a component of a data object of a composite type data type.

The method in the mentioned example relates to a first data sub-element and a second data sub-element, each of which is of the data type of a composite type and each of which comprises at least a first component and a second component. The first component and the second component are associated with each other via a third relation. Analogous to the first and second relations described above, a third relation exists between the first component and the second component if the first component and the second component are each identically named or if a relation between the two components is explicitly defined in the second control program. The third relation states that the first component of the first data sub-element and the second component of the second data sub-element each assume an identical function or role in the first control program and in the second control program. In a data migration of the first data element to the second data element, in which the information of the first data element is to be transferred to the second data element, the first component would thus be transferred to the second component, since, characterized by the third relation, the second component corresponds to the first component in the second data element of the second control program.

In a first component-address-determining step, a first relative component address of the first component in the memory area of the first data element is determined on the basis of the first relative pointer address. The first relative component address here describes a memory address in the memory area of the first data element of the first component relative to the first relative memory address of the first data sub-element. The absolute memory address of the first component of the first data sub-element referenced by the first pointer element is in the first component-address-determining step converted into a relative memory address of the first component within the first data sub-element by setting the absolute memory address of the first component in relation to the already known first relative memory address of the first data sub-element.

Based on the first relative component address of the first component, a second relative component address of the second component of the second data sub-element is determined in a second component-address-determining step. The second relative component address describes a memory address in the memory area of the second data element relative to the second relative memory address of the second data sub-element. Thus, the memory address within the memory area of the first data element described by the first relative component address corresponds to a memory address within the memory area of the second data element described by the second relative component address.

Based on the second relative component address, the second relative memory address of the second data sub-element and the first memory location of the second data element, an absolute memory address of the second component in the second memory area is determined in the first address-determining step. The second relative component address describes a memory address of the second component relative to the known second relative memory address of the second data sub-element in the memory area of the second data element. With these two pieces of information and the known absolute memory address of the first memory location of the second data element in the second memory area, an absolute memory address of the second component of the second data sub-element of the second data element may be determined.

According to an example, the pointer migration step comprises:

if the first data sub-element and the second data sub-element are each of a field type having identical dimensions, if the first data sub-element comprises a plurality of first elements and the second data sub-element comprises a plurality of second elements, if at least a first element and a second element are associated via a fourth relation, and if the first pointer element references the first element, determining a first relative element address of the first element referenced by the first pointer element in a first element-address-determining step, the first relative element address describing a memory address in the memory area of the first data element of the first element referenced by the first pointer element relative to the first relative memory address of the first data sub-element, determining, based on the first relative element address, a second relative element address of a second element associated with the first element referenced by the first pointer element via the fourth relation in a second element-address-determining step, wherein the second relative element address describes a memory address of the second element in the memory area of the second data element relative to the second relative memory address of the second data sub-element, and determining an absolute memory address of the second element of the second data sub-element based on the second relative element address, the second relative memory address of the second data sub-element, and the first memory location of the second data element in the memory area of the second data element in the first address-determining step.

This achieves the technical advantage of providing a precise method for data migration of a pointer element, in which the pointer element references an element of a data object of a field type data type.

The method in the described example relates to the case in which the first data sub-element and the second data sub-element are each of the data type of a field type with identical dimensions and the first data sub-element comprises a plurality of first elements and the second data sub-element comprises a plurality of second elements, wherein at least a first element and a second element are associated with each other via a fourth relation. Two elements are associated via a fourth relation if both elements are identically indexed. Furthermore, a relation may exist between two elements of two data sub-objects of a field type if such a relation is explicitly defined in the second control program.

Furthermore, the method in the described example relates to the case in which the first pointer element references a first element of the first data sub-element.

In a first element-address-determining step, a first relative element address of the first element of the first data sub-element referenced by the first pointer element is determined. The first relative element address here describes a memory address in the memory area of the first data element relative to a first relative memory address of the first data sub-element. In the first element-address-determining step, an absolute memory address of the first element of the first data sub-element referenced by the first pointer element in the first memory area is thus converted into a relative memory address of the first element within the memory area occupied by the first data element relative to the known first relative memory address of the first data sub-element.

Based on the first relative element address, a second relative element address of the second element of the second data sub-element related to the first element is determined in a second element-address-determining step. The second relative element address describes a memory address in the memory area of the second data element of the second element related to the first element relative to the second relative memory address of the second data sub-element. Within the memory area of the second data element and relative to the first memory location of the second data element, the second relative element address describes a memory address corresponding to the memory address of the first relative element address of the first element within the memory area of the first data element.

Based on the second relative element address, the second relative memory address of the second data sub-element, and the absolute memory address of the first memory location of the second data element in the second memory area, an absolute memory address of the second element of the second data sub-element related to the first element is determined in the first address-determining step.

According to an example, the first element-address-determining step comprises:

determining a first element size of the first elements of the first data sub-element in an element-size-determining step, wherein the first element size of a first element corresponds to a memory area in the first memory area occupied by the first element, and determining the first element referenced by the first pointer element based on the first relative pointer address and the first element size.

This achieves the technical advantage of providing the simplest possible way for determining the first element of the first data sub-element referenced by the pointer element.

In an element-size-determining step, the size of the first elements of the first data sub-element is first determined. The size of a first element or the first element size describes a memory area that is occupied by the first element in the memory area of the first data element.

Subsequently, the first element referenced by the first pointer element is determined based on the first relative pointer address and the first element size. The first relative pointer address describes a memory address in the memory area of the first data element relative to the first relative memory address of the first data sub-element. The first relative pointer address thus describes a distance, counted in memory locations, from the memory address referenced by the first pointer element to the first relative memory address of the first data sub-element. If this distance of the referenced memory address to the relative memory address of the first data sub-element is set in relation to the element size, the element in which the referenced memory address of the first relative pointer address is located may be determined.

According to an example, the pointer migration step comprises:
- determining, on the basis of the first relative pointer address and the first relative component address, a first relative pointer partial address in a fifth pointer-address-determining step, wherein by the first relative pointer partial address a memory location in the memory area of the first data element referenced by the first pointer element is described relative to the first relative component address of the first component of the first data sub-element,
- determining, on the basis of the first relative pointer partial address, the second relative pointer address, and the second relative component address, a second relative pointer partial address in a sixth pointer-address-determining step, wherein a memory location in the memory area of the second data element relative to the second relative component address is determined by the second relative pointer partial address, and wherein the second relative pointer partial address in relation to the second data element corresponds to the first relative pointer partial address in relation to the first data element; and
- determining an absolute memory address of the second component of the second data sub-element on the basis of the second relative pointer partial address, the second relative component address, the second relative memory address of the second data sub-element, and the first memory location of the second data element in the second memory area in the first address-determining step.

This achieves the technical advantage of providing a precise method for data migration of a pointer element, in which the pointer element references a memory address in a component of a data object of a compound type data type.

In a fifth pointer-address-determining step, a first relative pointer partial address is determined based on the first relative pointer address and the first relative component address of a component of the first data sub-element referenced by the first pointer element. The first relative pointer partial address describes a memory location in the memory area of the first data element referenced by the first pointer element relative to the first relative component address of the component of the first data sub-element referenced by the first pointer element. Here, the first relative pointer partial address differs from the first relative component address if the memory address referenced by the first pointer element differs from the first memory location of the first component. This is the case when the first pointer element points into the first component. In particular, this may occur if the first components of the first data sub-element in turn have complex data types and are e.g. themselves of a compound type and in turn have components that are referenced by the pointer element.

Based on the first relative pointer partial address, the second relative pointer address, and the second relative component address, a second relative pointer partial address is determined in a sixth pointer-address-determining step. The second relative pointer partial address describes a memory location in the memory area of the second data element relative to the second relative component address. Within the second data element, the second relative pointer partial address describes a memory address corresponding to the memory address described by the first relative pointer partial address within the memory area of the first data element. By the correspondence of the two pointer partial addresses, the first pointer element and the second pointer element point relatively within the first data element and the second data element to the same area of the first component of the first data sub-element and the second component of the second data sub-element associated via the third relation.

Based on the second relative pointer partial address, the second relative component address, the second relative memory address of the second data sub-element, and the absolute memory address of the first memory location of the second data element, an absolute memory address of the second component of the second data sub-element is determined in the first address-determining step.

According to an example, the pointer migration step comprises:
- determining, on the basis of the first relative pointer address and the first relative element address, a third relative pointer partial address in a seventh pointer-address-determining step, wherein, with the third relative pointer partial address, a memory location in the memory area of the first data element referenced by the first pointer element is described relative to the first relative element address of the first element of the first data sub-element,
- determining, on the basis of the third relative pointer partial address, the second relative pointer address, and the second relative element address, a fourth relative pointer partial address in an eighth pointer-address-determining step, wherein a memory location in the memory area of the second data element is determined relative to the second relative element address by the fourth relative pointer partial address, and wherein the fourth relative pointer partial address in relation to the second data sub-element corresponds to the third relative pointer partial address in relation to the first data sub-element; and
- determining an absolute memory address of the second element of the second data sub-element on the basis of the fourth relative pointer partial address, the second relative element address, the second relative memory address of the second data sub-element, and the first memory location of the second data element in the second memory area in the first address-determining step.

This achieves the technical advantage of providing a precise method for data migration of a pointer element, in which the pointer element references an element of a data object of the field type data type.

In a seventh pointer-address-determining step, a third relative pointer partial address is determined based on the first relative pointer address and the first relative element address. Analogously to the case in which the first data sub-element and the second data sub-element are a composite type and the first pointer element points into a component of the first data sub-element, the first pointer partial address describes a memory address referenced by the first pointer element within the memory area of the first data element relative to first relative element address of the referenced first element of the first data sub-element. The third relative pointer partial address differs from the first relative element address when the first pointer element points into the first element of the first data sub-element. This may in particular occur if the first element is again of a complex data type and again comprises intrinsic elements or components referenced by the first pointer element.

In an eighth pointer-address-determining step, a fourth relative pointer partial address is determined based on the third relative pointer partial address, the second relative pointer address, and the second relative element address.

Subsequently, an absolute memory address of the second element is determined based on the fourth relative pointer partial address, the second relative element address, the second relative memory address of the second data sub-element and the absolute memory address of the first memory location of the second data element. With the determined fourth relative pointer partial address, an absolute memory address is determined within the memory area of the second data element, which, within the second data element, corresponds to the memory address referenced by the first pointer element within the first element of the first data sub-element. This ensures that the second pointer element references an area within the second element of the second data sub-element that corresponds to the area within the first element of the first data sub-element that is referenced by the first pointer element.

According to an example, the pointer migration step further comprises:
  detecting that a first memory address referenced by the first pointer element is a first memory address of a data sub-element, in a first detecting step; or
  detecting that a first memory address referenced by the first pointer element is a first memory address of a first component of a data sub-element, in a second detecting step; or
  detecting that a first memory address referenced by the first pointer element is a first memory address of a first element of a data sub-element, in a first detecting step.

This has the technical advantage that an unambiguous migration of pointers is achieved. In particular, unambiguous migration may be ensured in case of ambiguous memory addresses. If the first pointer element references a first memory location of a data sub-element of a compound type, the method allows for a distinction to be made between referencing the data sub-element and referencing the first components of the data sub-element, which may also be referenced with the first memory location. Similarly, the method allows for a distinction to be made, in the case of a data sub-element of a field type, between a referencing of the data sub-element and a referencing of the first element of the data sub-element. For this purpose, the data types of the data sub-elements, of the components and of the elements, as well as the data types of the pointer elements may be taken into account in the method, and it may be decided on the basis of the data types whether a first pointer element references a data sub-element or a component or an element of the data sub-element.

According to an example, the first data element comprises at least one further first data sub-element, wherein the first data sub-element and the at least one further first data sub-element are associated via a first inheritance relation, wherein the second data sub-element comprises at least one further second data sub-element, wherein the second data sub-element and the at least one further second data sub-element are associated via a second inheritance relation, and wherein the pointer migration step comprises:
  determining the first inheritance relation between the first data sub-element and the at least one further first data sub-element in a first inheritance determining step, wherein the first data sub-element is a sub-type of the further first data sub-element; and
  determining the inheritance relationship between the second data sub-element and the at least one further second data sub-element in a second inheritance determining step, wherein the second data sub-element is a sub-type of the further second data sub-element.

This achieves the technical advantage of providing unambiguous migration of pointer elements referencing data sub-elements associated with further data sub-elements via an inheritance relation.

A sub-type is a data object that, according to an inheritance relation, is a child object of at least one parent object and has at least one feature or attribute of at least one parent object due to the inheritance relation.

According to an example, the method further comprises:
  verifying that the first pointer object is encompassed by the first data element in an object-verifying step,
  if the first pointer object is not comprised by the first data element, identifying the second pointer object as the first pointer object in a third object-identifying step, and
  writing the value of the first pointer element to the second pointer element in a second pointer-storing step.

This achieves the technical advantage of providing a precise method for data migration of a pointer element, in which the pointer element references a pointer object that is not within a global state of a control program of an automation system to be migrated.

The method in the present example relates to the case in which the first pointer element references a first pointer object, wherein the first pointer object is not comprised by the first data element. Thus, the first pointer object is not a first data sub-element, a first component, or a first element or object of the first data element.

An object-verifying step verifies that the first pointer object is encompassed by the first data element.

If the first pointer object is not comprised by the first data element, the second pointer object is identified as the first pointer object in a third object-identifying step. Since the first pointer element and the second pointer element are associated with each other via the first relation and thus the first pointer element within the first control program and the second pointer element within the second control program perform identical functions and roles, it must be ensured that the first pointer element and the second pointer element reference identical objects or, respectively, first and second pointer objects that are associated with each other via a relation. Since the first pointer object is not part of the first data element and is thus not affected by a data migration of the first data element to the second data element, the memory address of the first pointer object referenced by the first pointer element is not changed by the data migration of the first data element to the second data element.

In order to be able to ensure that after successful data migration the second pointer element, which corresponds to the first pointer element within the second control program, references the first pointer object, the memory address of the first pointer object referenced by the first pointer element, which was equated to the second pointer object in the third object-identifying step, is stored in the second pointer element in a second pointer-storing step. This ensures that after successful data migration, the second pointer element references the pointer object stored outside the first data element and the second data element.

According to an example, the pointer migration step comprises:
  identifying a third pointer element in a second pointer-identifying step, wherein the third pointer element is not encompassed by either the first data element or the second data element, and wherein the third pointer element references a third pointer object encompassed by the first data element, wherein the third pointer object is a first data sub-object, a first component or a first element, and wherein the third pointer object is associated with a second data sub-object, a second component or a second element via a second relation, a third relation or a fourth relation, determining an absolute memory address of the second data sub-element associated with the third pointer object, the second component associated with the third pointer object, or the second element associated with the third pointer object in the second memory area in a second address-determining step; and writing the absolute memory address of the second data sub-element associated with the third pointer object, the second component associated with the third pointer object, or the second element associated with the third pointer object as the value of the third pointer element in a third pointer-storing step.

This provides the technical advantage of providing a precise method for data migration of a pointer element in the course of data migration of a program state, in which the pointer element is not part of the program state to be migrated, but references a pointer object that is part of the program state to be migrated.

The method in the following example relates to the case in which a third pointer element that is not included in either the first data element or the second data element references a third pointer object that is an object of the first data element.

To this end, a second pointer-identifying step identifies a third pointer element that is not encompassed by either the first data element or the second data element and references a third pointer object that is comprised by the first pointer element. The first pointer object may be a first data sub-element or a first component or a first element of a first data sub-element. The third pointer object is further associated with an object of the second data element, corresponding to a second data sub-element or a second component or a second element of a second data sub-element via a corresponding relation.

In a second address-determining step, a memory address of the object of the second data element associated with the third pointer object is determined. The address determination of the object of the second data element, which may be a second data sub-element or a second component or a second element of a second data sub-element, may comprise the preceding method steps in which first relative memory addresses of the third pointer object in the memory area of the first data element are determined and, on the basis of these determined relative memory addresses, a relative memory address of the object of the second data element associated with the third pointer object in the memory area of the second data element is determined.

In a third pointer-storing step, the determined absolute memory address of the object of the second data element associated with the third pointer object is stored in the third pointer element, wherein the third pointer element remains unaffected by the data migration of the first data element to the second data element and continues to be stored in a memory area outside the memory area of the first data element and outside the memory area of the second data element.

According to an example, the method further comprises:
generating a first pointer migration function for mapping the first pointer element to the second pointer element in a function-generating step, wherein the first pointer migration function is arranged to map a pointer element of the first pointer type to a pointer element of the second pointer type and to execute the pointer migration step.

This achieves the technical advantage that the data migration of the pointer element may be performed by executing a first pointer migration function. For this purpose, a first pointer migration function is generated in a function-generating step, which is set up to map a pointer element of the first pointer type to a pointer element of a second pointer type and to execute the pointer migration step.

The first pointer migration function is not limited to mapping the first pointer element to the second pointer element. Rather, the first pointer migration function is able to map different pointer elements to each other, each of which is of a first pointer type and a second pointer type. A pointer type of a pointer element describes a data type of the respective pointer element. The pointer type of the respective pointer element takes into account the data type of the pointer object referenced by the pointer element. For example, a pointer element may be of the same data type as the pointer object referenced by the respective pointer element.

By generating the first pointer migration function, it is achieved that the migration process of the pointer element or the data migration process of the first data element to the second data element is accelerated. By using pointer migration functions for mapping first pointer elements to second pointer elements, it may be achieved that functions may be used for different data migration operations of a plurality of first pointer elements to second pointer elements. Thus, particularly in the case of a plurality of first and second pointer elements, it may be avoided that for each individual first pointer element a corresponding mapping rule to a respective second pointer element has to be provided. Instead, the generated pointer migration functions suitable for mapping the corresponding pointer element with the respective pointer type may be called and executed as often as desired. This speeds up the migration process of the pointer elements in terms of time. In addition, generated pointer migration functions may be reused for subsequent data migration operations.

According to an example, the function-generating step comprises:
identifying the first pointer type of the first pointer element and the second pointer type of the second pointer element in a type-identifying step.

This has the technical advantage that the pointer migration functions may be adjusted to the respective pointer types of the pointer elements to be migrated. In the function-generating step, the pointer types of the first pointer elements and the pointer types of the second pointer elements are identified. Based on the identified first and second pointer types, the first pointer migration functions are generated, so that the respective generated pointer migration functions are arranged to map pointers of the first pointer type to pointers of the second pointer type. Information from the first control program and from the second control program may be used to identify the first pointer types of the first pointer elements and the second pointer types of the second pointer elements. The pointer types of the first and second pointer elements are defined in the first and second control programs.

According to an example, the method further comprises:
verifying that the first pointer migration function could be generated in the function-generating step, in a first verifying step, and if in the function-generating step the first pointer migration function could not be generated, setting the second pointer element to an initial value in an initializing step, and/or if the first pointer migration function could not be generated in the function-generating step, aborting the migration in a terminating step, wherein the first pointer migration function cannot be generated if the first pointer type of the first pointer element cannot be uniquely represented by the second pointer type of the second pointer element.

This has the technical advantage that a flexible method for data migration of pointer elements may be provided in the course of data migration of a program state of a control program of an automation system.

In a first verifying step, it is verified whether the first pointer migration function could be generated in the function-generating step. If the generation of a first pointer migration function failed, a first pointer element cannot be mapped to a second pointer element and the data migration of the first pointer element fails.

If a first pointer migration could not be generated, the second pointer element may be set to an initial value in an initializing step. This ensures that, despite failed data migration of the first pointer element to the second pointer element, the second pointer element may still be provided with a permissible numerical value, so that after completed data migration of the first data element to the second data element, the second control program may access the second data element and may be executed on the basis of the second data element.

Alternatively, if the generation of the first pointer migration function fails, the data migration of the first data element to the second data element or the data migration of the first pointer element to the second pointer element may be aborted in a terminating step. This avoids that in case of a failed data migration of the first pointer element to the second pointer element, the second pointer element is provided with an initial value that does not correspond to the value of the first pointer element.

This may e.g. be advantageous if the first pointer element references an object of the first data element that is essential for controlling the automation system. If, in the event of a failed data migration of the first pointer element to a corresponding second pointer element of the second data element, the corresponding second pointer element were set to an initial value, so that referencing of the corresponding object by the second pointer element is not ensured, a serious error could occur when controlling the automation system on the basis of the second control program taking the second data element into account, and possible damage to the automation system or parts of the automation system could occur.

To avoid this, if the data migration is faulty, the migration may be aborted completely instead of continuing the data migration of the first data element to the second data element and providing the second pointer element with an initial value. By aborting the data migration, the automation system may be controlled further on the basis of the first control program taking into account the first data element and a malfunction of the automation system justified by the control on the basis of the second control program taking into account the second data element including the incorrectly migrated second pointer element may be avoided.

According to an example, the controller further comprises a compiler module for interpreting a control program, and wherein the function-generating step is performed by the compiler module.

This has the technical advantage that an efficient and reliable solution for generating the pointer migration function may be achieved. The function-generating step, in which both the pointer migration function and the pointer types of the first and second pointer elements to be migrated are generated and determined, may be automatically executed by a compiler module for interpreting a control program. During the compilation process of a source code of the second control program, the function-generating step may be executed by the compiler module and the first pointer migration functions may be generated. Based on these generated pointer migration functions, the first pointer elements of the first data element may then be mapped to the second pointer elements of the second data element. This achieves a time-efficient migration process.

According to an example, the method further comprises:
mapping the first data element to the second data element and/or mapping the first data sub-element to the second data sub-element and/or mapping the first components to the second components and/or mapping the first elements to the second elements in a migration step.

This achieves the technical advantage that a method for data migration of a program state of a control program of an automation system with data migration of a pointer element may be provided. In a migration step, the first data element is mapped to the second data element. This comprises mapping all objects of the first data element to corresponding objects of the second data element, which are associated with the objects of the first data element via corresponding relations.

In the migration step, first data elements may thus be mapped to second data elements associated via corresponding second relations. Furthermore, first components of the first data elements may be mapped to second components of the second data sub-elements associated via corresponding third relations. Furthermore, first elements of the first data sub-elements may be mapped to second elements of the second data sub-elements of the second data element associated via corresponding fourth relations. By mapping the objects of the first data element to the objects of the second data element in the migration step, the information of the first data element comprising the global state of the first control program and of the automation system controlled via the first control program may be mapped to the second data element and the objects contained therein.

In parallel, the pointer migration step may be used to map first pointer elements of the first data element to second pointer elements of the second data element associated via first relations. This allows a global state of the first control program to be mapped to the second data element.

After replacing the first control program with the second control program, the second control program may thus access the global state of the first control program stored in the second data element after successful migration, and the automation system may be controlled based on the second control program, taking into account the global state of the first control program in the state in which the automation system was before the start of the data migration process. This provides an efficient method for migrating a program state including a data migration of a pointer element, which allows for replacing a first control program with a second control program and for transferring the program state of the first control program to the second control program.

According to an example, the function-generating step comprises:
  generating a second pointer migration function, the second pointer migration function being arranged to perform the second address-determining step and the third pointer-storing step and to map the third pointer object to a corresponding second data sub-element, a corresponding second component or a corresponding second element.

This achieves the technical advantage of providing an efficient method for data migration of a pointer element in the course of data migration of a program state of an automation system. By generating a second pointer migration function that is arranged to execute the second address-determining step and the third pointer-storing step and to map the third pointer object to a corresponding object of the second data element, a time-efficient data migration of the third pointer element may be achieved. Data migration by executing corresponding migration functions has the advantage that when data migration of different migrating pointer elements is performed multiple times, corresponding migration functions may be accessed multiple times, which accelerates the migration process in terms of time. In addition, generated pointer migration functions may be reused for subsequent migration operations.

According to an example, the method further comprises:
  generating a first migration function for mapping the first data element to the second data element, the first migration function being arranged to read out data of a first data type of the first data element in the first memory area, to convert read-out data of the first data type into a second data type of the second data element, and to store data converted to the second data type in the second memory area,
  generating a second migration function for mapping the first data sub-element to the second data sub-element, the second migration function being arranged to read out data of a third data type of the first data sub-element in the first memory area, to convert read-out data of the third data type into a fourth data type of the second data sub-element, and to store data converted into the fourth data type in the second memory area,
  generating a third migration function for mapping the first component to the second component, the third migration function being arranged to read out data of a fifth data type of the first components in the first memory area, to convert the read-out data into a sixth data type of the second component, and to store the converted data in the second memory area, and
  generating a fourth migration function for mapping the first elements to the second elements in a generating step, the fourth migration function being arranged to read out data of a fifth data type of the first elements in the first memory area, to convert the read-out data to a sixth data type of the second components, and to store the converted data in the second memory area.

This has the technical advantage that a precise and efficient data migration of a program state may be achieved. By using migration functions to map the first data element to the second data element, an acceleration of the migration process may be achieved. Furthermore, generated migration functions may be reused for future migration operations. By generating the appropriate migration function, these may be embodied to the respective objects to be migrated.

According to an example, the generating step comprises:
  identifying the first data type of the first data element and the second data type of the second data element,
  identifying the third data type of the first data sub-element, the fourth data type of the second data sub-element, and the second relation between the first data sub-element and the second data sub-element,
  identifying the fifth data type of the first component of the first data sub-element, the sixth data type of the second component of the second data sub-element, and the third relation between the first component and the second component; and
  identifying the seventh data type of the first element of the first data sub-element, the eighth data type of the second element of the second data sub-element, and the fourth relation between the first element and the second element in an identifying step.

This has the technical advantage that the corresponding migration functions may be adjusted to the data types of the respective objects to be migrated of the first data element and the second data element. The migration functions are thus not limited to mapping a specific object of the first data element to a specific object of the second data element, but are suitable for mapping different objects of a specific data type to each other. This makes it possible to achieve a high degree of flexibility and an accelerated migration process.

According to an example, the method further comprises:
  verifying whether the first migration function and/or the second migration function and/or the third migration function and/or the fourth migration function could be generated in the generating step, in a second verifying step, wherein the first migration function cannot be generated if the first data type of the first data element is not convertible into the second data type of the second data element, wherein the second migration function cannot be generated, when the third data type of the first data sub-element is not convertible into the fourth data type of the second data sub-element, wherein the third migration function cannot be generated when the fifth data type of the first components of the first data sub-element is not convertible into the sixth data type of the second components of the second data sub-element and wherein the fourth migration function cannot be generated if the sixth data type of the first component of the first data sub-element is not convertible to the eighth data type of the second component of the second data sub-element, and
  if the first migration function and/or the second migration function and/or the third migration function and/or the fourth migration function could not be generated, aborting the data migration of the first data element to the second data element in the terminating step.

This has the technical advantage that the migration of the first data element to the second data element may be aborted if required migration functions for mapping the objects of the first data element to the objects of the second data element could not be generated. If the data migration of the first data element to the second data element is aborted, the control of the automation system may be continued on the basis of the first control program. Thus it may be avoided that a control of the automation system on the basis of the second control program under consideration of the far data element leads to a malfunction of the automation system due to a faulty data migration of the first data element to the second data element.

According to an example, a cyclic execution of the first control program is interrupted, and wherein the first data element describes a program state of the first control program and a state of the automation system at the time of a control cycle last executed based on the first control program.

This achieves the technical advantage that precise and effective data migration of the pointer element may be ensured. By interrupting the cyclic execution of the first control program, it is made sure that the value of the first data element remains unchanged at the time of data migration. By interrupting the execution of the first control program, no further data is written to the first data element and the value of the first data element corresponds to the value at the end of the last executed control cycle. This allows a precise and unambiguous mapping of the value of the first data element to the second data element including an unambiguous mapping of the value of the first pointer element to the second pointer element.

According to an example, the second control program is an update of the first control program and is configured to replace the first control program and to control the automation system by cyclically executing the second control program, taking into account the second data element.

This achieves the technical advantage that, after successful data migration of the program state of the first control program and mapping of the value of the first data element to the second data element based on the second control program, the automation system may be controlled taking into account the second data element in a state in which the automation system was at the time of the last executed control cycle based on the first control program. Thus, the first control program may be replaced by the second control program and the automation system may be controlled on the basis of the second control program in the state of the last executed control cycle.

FIG. 1 shows a schematic diagram of an automation system 100 according to an example.

The automation system 100 in FIG. 1 comprises a controller 101, a master subscriber 103 and four slave subscribers 105, each of which is connected to one another and to the controller 101 via a bus system 107. In a memory SP of the controller 101, a first control program A is stored in a first memory area SPA and a second control program B is stored in a second memory area SPB. The first control program A is used for cyclically controlling the master subscriber 103 and the slave subscribers 105. The second control program B is an updated version of the first control program A and is also used for cyclically controlling the subscribers of the automation system 100. An updated version may e.g. be an update of the first control program A or a modified version of the first control program A. The second control program B is thus based on the first control program A and may deviate from the first control program A in various areas of the control program.

The automation system 100 shown in FIG. 1 merely serves as an exemplary illustration of an automation system. The method is not intended to be limited to the automation system shown in FIG. 1.

Figure 2:
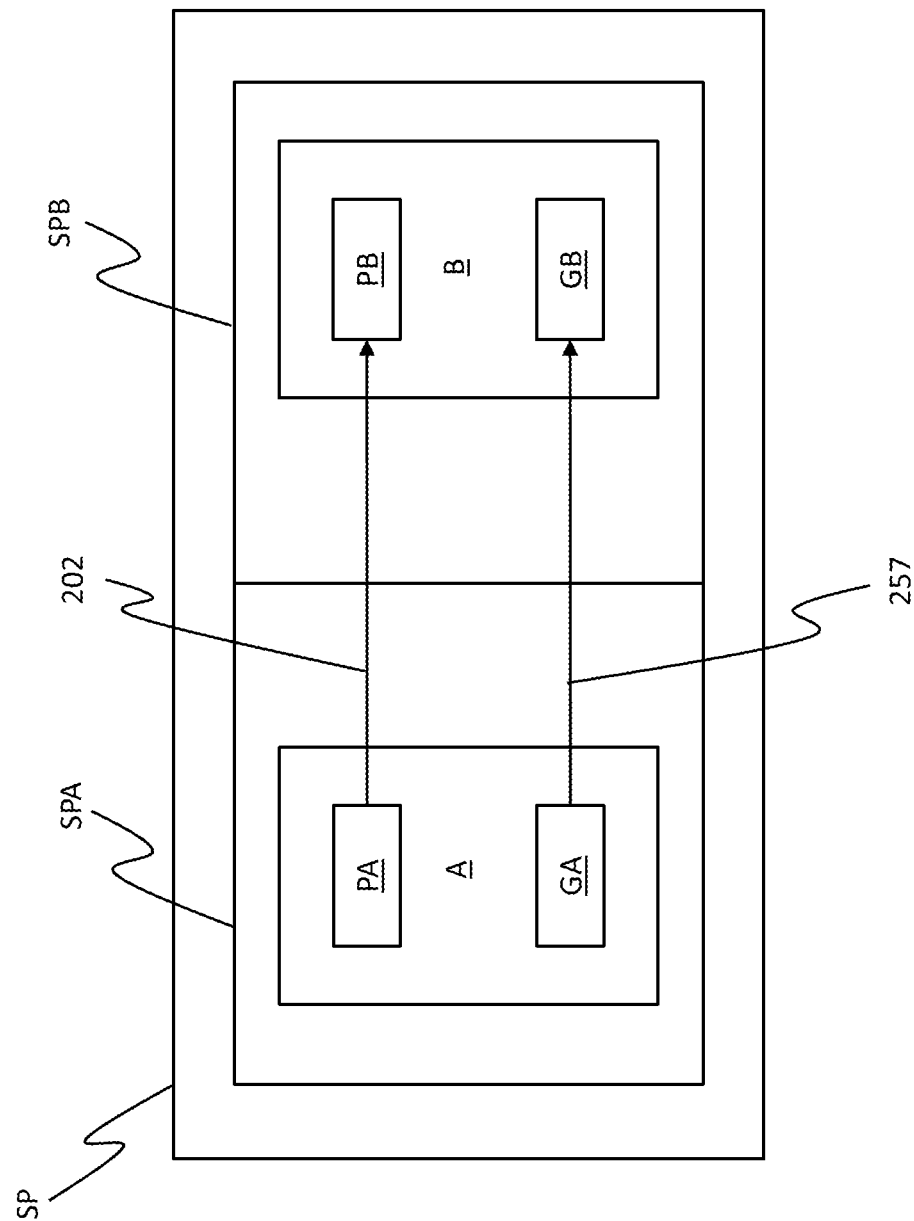
FIG. 2 is a schematic depiction of an update process of a control program of an automation system according to an example.

FIG. 2 shows a schematic depiction of an update process of a control program A of an automation system 100 according to an example.

FIG. 2 shows the memory SP of the controller 101 of the automation system 100 of FIG. 1. The memory SP is divided up into the first memory area SPA and the second memory area SPB. The first memory area SPA stores the first control program A, and the second memory area SPB stores the second control program B. The first control program A comprises a first executable code PA and a first data element GA, and the second control program B comprises a second executable code PB and a second data element GB.

The first executable code PA of the first control program A serves for executing the control program A and may be executed by the controller 101. The second executable code PB of the second control program B is for executing the second control program B and may be executed by the controller 101. The first data element GA describes a program state of the first control program A. The program state of the first control program A corresponds to the global state of the first control program A and comprises all information required for executing the first control program A. The global state of the first control program A includes all information required for executing the first control program A. Moreover, the global state of the first control program A comprises all information regarding the automation system 100 and describes the state of the automation system 100 cyclically controlled by the first control program A.

In a first read/write step, the first executable code PA may read information from or write information to the first data element GA. The second data element GB describes a program state of the second control program B and comprises all information required for executing the second control program B.

At the time of data migration, the second control program B is not executed, and the second data element GB therefore does not comprise any information regarding the state of the automation system 100. At the time of data migration, all objects required for executing the second control program B and for controlling the automation system 100 are stored in the second data element GB. However, the individual objects are only initiated with an initial value.

After data migration of the global state of the first control program A stored in the first data element GA to the second data element GB, the second data element comprises all information required for executing the second control program B. Furthermore, after successful data migration of the global state of the first control program A, the second data element GB comprises the information relating to the state in which the automation system 100 was at the point in time before the data migration was performed, in particular at the time of the last executed control cycle. In a second read/write step, the second executable code PB of the second control program B may write data to the second data element GB or read data from the second data element GB.

For updating the first control program A by the second control program B with simultaneous data migration of the program state of the first control program A according to the method for updating a control program of an automation system 100 with data migration of a program state of the control program, the first executable code PA of the first control program A is replaced by the second executable code PB of the second control program B in a first replacement step 202. Furthermore, a value of the first data element GA describing the program state of the first control program A, in particular the global state of the first control program A and of the automation system 100, is mapped to the second data element GB in a migration step 261.

By mapping the value of the first data element GA to the second data element GB in migration step 261, the program state of the first control program A or, respectively, the global state of the first control program A and of the automation system 100 described by the value of the first data element GA is stored in the second data element GB. After successful data migration in migration step 261, the second data element GB thus describes the program state of the first control program A and thus the global state of the first control program A and of the automation system 100.

After successfully replacing the first executable code PA by the second executable code PB in the first replacement step 202 and successful data migration of the global state of the first control program A or of the automation system 100 into the second data element GB of the second control program B in the migration step 261, the second control program B is executable by the controller 101 of the automation system 100 and may access the global state of the first control program A or of the automation system 100 at the time of the last executed control cycle, so that the automation system 100 may be controlled by the second control program B in the state at the time of the last executed control cycle, so that the automation system 100 may be controlled by the second control program B in the state at the time of the last executed control cycle.

Figure 3:
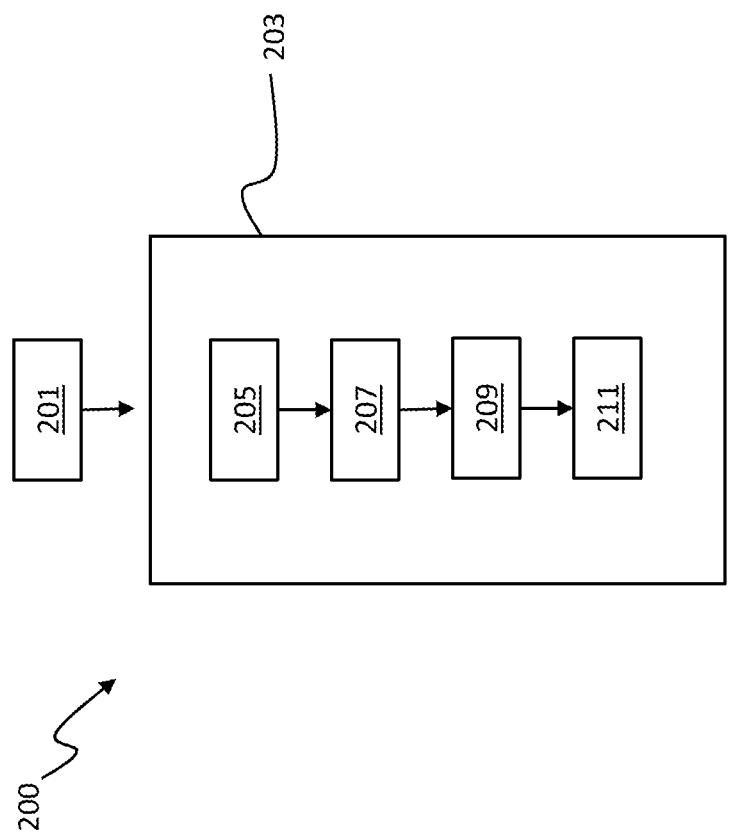
FIG. 3 is a flowchart of a method for data migration of a pointer element in an automation system according to an example.
Figure 4:
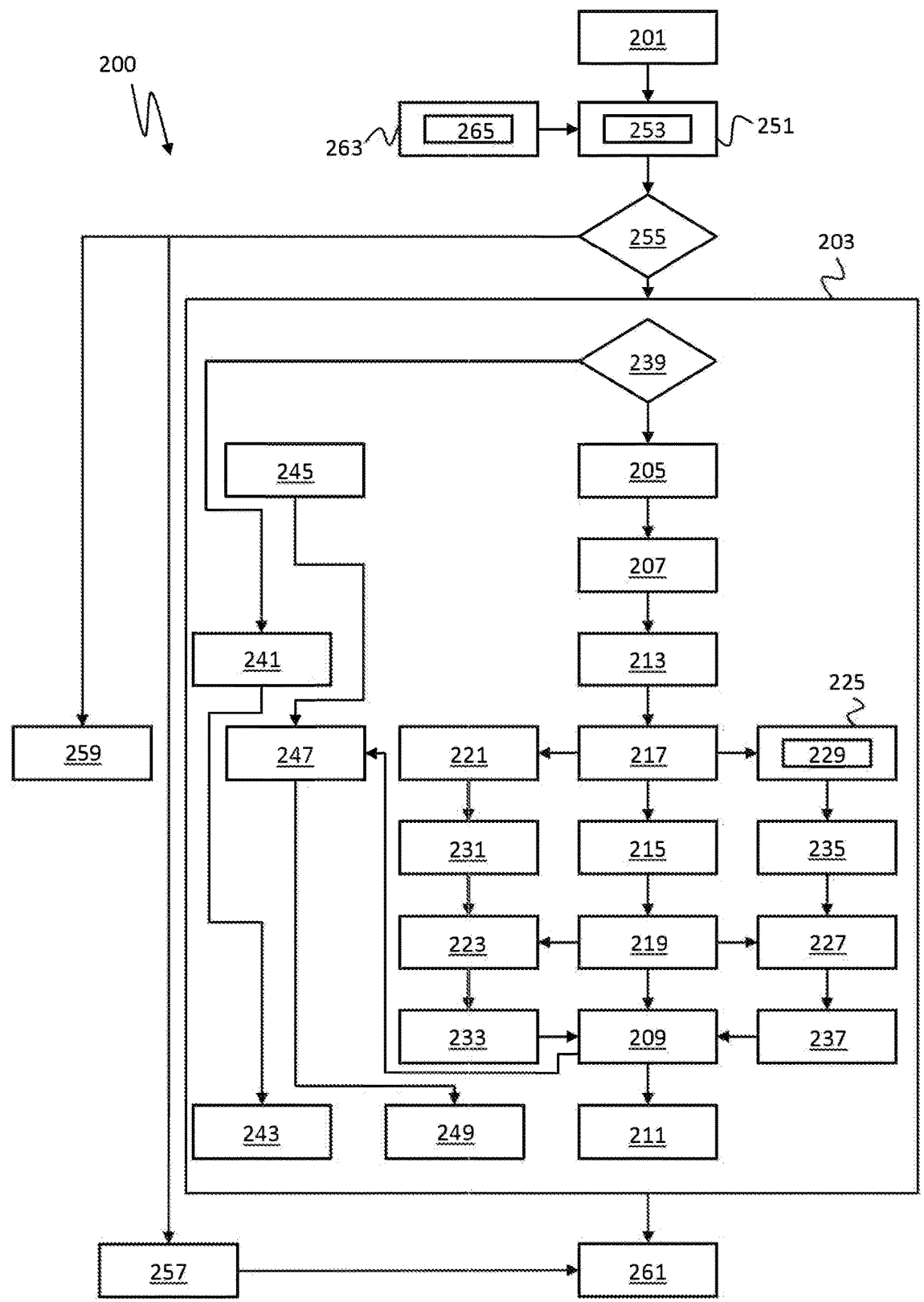
FIG. 4 is a flowchart of the method for data migration of a pointer element in an automation system according to a further example.

The description of the method 200 shown in FIG. 3 and FIG. 4 is made with reference to the objects shown in FIGS. 5 to 9.

The method 200 in FIG. 3 and FIG. 4 refers to, but is not intended to be limited to, an automation system 100 according to FIG. 1 and a data migration process according to FIG. 2.

FIG. 3 shows a flowchart of a method 200 for data migration of a pointer element in an automation system 100 according to an example.

In the example of the method 200 for data migration of a pointer element in the course of a data migration of a program state of a control program of an automation system 100 in FIG. 3, a controller 101 of the automation system 100 comprises a first control program A and a second control program B, wherein the first control program A comprises a first data element GA describing a program state of the first control program A and comprising at least a first pointer element Z1 of a first pointer type, which references a first pointer object ZO1, and wherein the second control program B comprises a second data element GB describing a program state of the second control program B and comprising at least one second pointer element Z2 of a second pointer type which is configured to reference a second pointer object ZO2.

The method 200 comprises the method steps:
identifying the first pointer element Z1 and the second pointer element Z2 as pointer elements associated with each other via a first relation R1 in a first pointer-identifying step 201,
mapping the first pointer element Z1 to the second pointer element Z2 in a pointer migration step 203, wherein the pointer migration step comprises 203:
identifying the first pointer object ZO1 referenced by the first pointer element Z1 in a first object-identifying step 205,
identifying an object associated with the first pointer object ZO1 as the second pointer object ZO2 in a second object-identifying step 207,
determining an absolute memory address of the second pointer object ZO2 in a first address-determining step 209, and
writing the determined memory address of the second pointer object ZO2 as a value of the second pointer element Z2 into the second pointer element Z2 in a first pointer-storing step 211.

In order to map the first data pointer element Z1 to the second pointer element Z2, a first relation R1 is identified between the first pointer element Z1 and the second pointer element Z2 in a first pointer-identifying step 201. The first pointer element Z1 and the second pointer element Z2 are associated with each other via the first relation R1 if the first pointer element Z1 and the second pointer element Z2 are identically named. Moreover, the first pointer element Z1 and the second pointer element Z2 may be associated with each other via the first relation R1 if such a relation is explicitly defined in the second control program B. The relation R1 between the first pointer element Z1 and the second pointer element Z2 implies that the first pointer element Z1 in the first control program A and the second pointer element Z2 in the second control program B take over an identical function and role. In a data migration of the first data element GA to the second data element GB to migrate the global state of the first control program A represented by the first data element GA, the first pointer element Z1 and the second pointer element Z1 thus have to be mapped to each other to map the information of the first data element GA to the second data element GB.

Subsequently, in a pointer migration step 203, the first pointer element Z1 is mapped to the second pointer element Z2.

For this purpose, a first pointer object ZO1 referenced by the first pointer element Z1 is identified in a first object-identifying step 205.

After identifying the first pointer object ZO1, a second object-identifying step 207 identifies an object associated with the first pointer object ZO1 as the second pointer object ZO2 of the second pointer element Z2. Identifying the object associated with the first pointer object ZO1 as the second pointer object ZO2 ensures that the object associated with the first pointer object ZO1 may be referenced by the second pointer element Z2.

After identifying the second pointer object ZO2, a memory address of the second pointer object ZO2 is determined in a first address-determining step 209, and the determined memory address of the second pointer object ZO2 is stored in the second pointer element Z2 in a first pointer-storing step 211. By storing the determined memory address of the second pointer object ZO2 in the second pointer element Z2, the second pointer element Z2 is arranged to reference the second pointer object ZO2. The fact that the second pointer object ZO2 is associated with the first pointer object ZO1 of the first pointer element Z1 ensures that after data migration is complete, the second pointer element Z2 references an object that corresponds to the first pointer object ZO1. For example, an association exists between the first pointer object ZO1 and the second pointer object ZO2 if both pointer objects are identical. In this case, the first pointer element Z1 and the second pointer element Z2 each reference the same object. Moreover, the first pointer object ZO1 and the second pointer object ZO2 may be associated with each other if e.g. the first pointer object ZO1 is an object of the first data element GA and the second pointer object ZO2 is an object of the second data element GB, each of which is associated with each other via a relation, the relation existing if both objects are named identically or if such a relation is explicitly defined in the second control program B.

After completion of the pointer migration step 203, the value of the first pointer element Z1 is mapped to the second pointer element Z2 and the second pointer element Z2 references a second pointer object ZO2 associated with the first pointer object ZO1. During a subsequent execution of the second control program B taking into account the second data element GB, it is thus ensured that an object is referenced by the second pointer element Z2 that corresponds to the first pointer object ZO1 or, in the context of the second control program B, takes over a role or function that corresponds to the role and function of the first pointer object ZO1 in the context of the first control program A.

FIG. 4 shows a flowchart of a method 200 for data migration of a pointer element in an automation system 100 according to another example.

The example of method 200 shown in FIG. 4 builds on the example shown in FIG. 3 and comprises all the method steps of the examples shown in FIG. 3. The process steps described for FIG. 3 are not explained further below.

For the procedure, the various method steps of the pointer migration step 203 are first described in more detail. In the following, the case is first described in which the first data element GA and the second data element GB are each stored in a first memory area SPA and a second memory area SPB and are each of the composite type data type, and the first data element GA comprises at least one first data sub-element GA1 and the second data element GB comprises at least one second data sub-element GB1. The first data sub-element GA1 and the second data sub-element GB1 are associated with each other via a second relation R2. In this regard, reference is made to FIG. 5, among others.

Furthermore, the first pointer element Z1 references the first data sub-element GA1 of the first data element GA and in the first object-identifying step 205 the first data sub-element GA1 was thus identified as the first pointer object ZO1 of the first pointer element Z1. The second pointer element Z2 references the second data sub-element GB1 of the second data element GB, and in the second object-identifying step 207 the second data sub-element GB1 was correspondingly identified as the second pointer object ZO2.

Subsequently, a first relative memory address RGA1 of the first data sub-element GA1 is determined in a first pointer-address-determining step 213. The first relative memory address RGA1 writes a memory address of the first data sub-element GA1 in the first memory area SPA of the first data element GA relative to a first memory location SPGA of the first element GA. The first data element GA is stored in the first memory area SPA as a contiguous data element and occupies a contiguous memory area within the first memory area SPA.

Subsequently, in a third pointer-address-determining step 217, a first relative pointer address PAR of the first pointer element Z1 is determined. The first relative pointer address PAR of the first pointer element Z1 writes a memory location referenced by the first pointer element Z1 within the memory area of the first data element GA relative to the first relative memory address RGA1 of the first data sub-element GA1. For a description of the first relative memory address PAR, please refer to FIG. 6 and the corresponding description section.

In the following, three different cases are considered. The first case refers to the constellation that the first data sub-element GA1 and the second data sub-element GB1 are each of the scalar type data type. In such a case, both the first pointer element Z1 and the second pointer element Z2 each reference the first memory location of the first data sub-element GA1 stored as a scalar type and the first memory location of the second data sub-element GB1. This case is described in the flowchart in FIG. 4 by the middle string starting from the third pointer-address-determining step 217.

The second case deals with the constellation that both the first data sub-element GA1 and the second data sub-element GB1 are of the composite type data type and the first data sub-element GA1 has a first component AM and the second data sub-element GB1 has a second component BM. In the present example, the first pointer element Z1 references the first component AM of the first data sub-element GB1 and the second pointer element Z2 references the second component BM of the second data sub-element GB1. The second case is described in the flowchart in FIG. 4 by the left string originating from the third pointer-address-determining step 217.

The third case describes the constellation that the first data sub-element GA1 and the second data sub-element GB1 are each of a field type data type and the first data sub-element GA1 comprises a first element AE and the second data sub-element GB1 comprises a second element BE. In the present example, the first pointer element Z1 references the first element AE of the first data sub-element GA1 and the second pointer element Z2 references the second element BE of the second data sub-element GB1. The third case is shown in the flowchart in FIG. 4 in the right-hand string originating from the third pointer-address-determining step 217.

In the case in which the first data sub-element GA1 and the second data sub-element GB1 are of a scalar type and the first pointer element Z1 and the second pointer element Z2 reference a first memory location of the first data sub-element GA1 and the second data sub-element GB1, a second relative memory address RGB1 of the second data sub-element GB1 is determined in a second pointer-address-determining step 215. The second relative memory address RGB1 describes a memory address of the second data sub-element GB1 within a memory area of the second data element GB relative to the first memory location SPGB of the second data element GB. Analogously to the first data element GA, the second data element GB is stored in the second memory area SPB as a contiguous element and has a first memory location of the memory area occupied by the second data element GB.

Subsequently, in a fourth pointer-address-determining step 219, a second relative pointer address PBR of the second pointer element Z2 is determined on the basis of the first relative pointer address PAR. The second relative pointer address PBR of a second pointer element Z2 describes a memory location within the memory area of the second data element GB relative to the second relative memory address RGB1 of the second data sub-element GB1.

For the first case, in which the first pointer element Z1 references a first memory location of the first data sub-element GA1, which is of the scalar type data type, and in which the second pointer element Z2 references a first memory location of the second data sub-element GB1, which is also of the scalar type data type, the first relative pointer address PAR and the second relative pointer address PBR are of value 0, since the first pointer element Z1 references a memory location described by the first relative memory address RGA1 of the first data sub-element GA1, and the second pointer element Z2 references a memory address described by the second relative memory address RGB1 of the second data sub-element GB1.

Thus, in the first address-determining step 209, an absolute memory address of the second data sub-element GB1 is determined on the basis of the second relative memory address RGB1 of the second data sub-element GB1 and the absolute memory address of the first memory location SPGB of the second data element GB. The absolute memory address of the first memory location SPGB of the second data element GB is known when the data migration of the pointer element is performed. Moreover, the structure of the second data element GB is known, so that the determined second relative memory address RGB1 of the second data sub-element GB1 and the known absolute memory address of the first memory location SPGB of the second data element GB may be used to convert the second relative memory address RGB1 into an absolute memory address.

Finally, the determined absolute memory address of the second data sub-element GB1 is stored as the value of the second pointer element Z2 in the first pointer-storing step 211.

In the second case, in which the first data sub-element GA1 and the second data sub-element GB1 are each of a composite type and the first data sub-element GA1 has a first component AM and the second data sub-element GB1 has a second component BM, each of which being associated with each other via a third relation R3, a first relative component address PAM is determined with the first component AM in a first component-address-determining step 221 based on the first relative pointer address PAR. The first relative component address PAM describes a memory address in the memory area of the first data element GA of the first component AM relative to the relative memory address of the first data sub-element GA1. For this purpose, reference is made to FIG. 6 and the corresponding description section.

Furthermore, in a fifth pointer-address-determining step 231, a first relative pointer partial address PAMX is determined based on the first relative pointer address PAR and the first relative component address PAM. The first relative pointer partial address PAMX describes a memory location within the memory area occupied by the first component AM within the memory area of the first data element GA. In the present example, the case is described where the first pointer element Z1 points into the first component AM to reference a memory address different from the first relative component address PAM. In the case in which the first pointer element Z1 references the first memory location of the memory area occupied by the first component AM, the first relative pointer partial address results in the value 0.

Furthermore, a second relative component address PBM of the second component BM is determined in a second component-address-determining step 223 based on the first relative component address PAM. The second relative memory address RGB1 determined in the second address-determining step 215 and the second relative pointer address PBR determined in the fourth pointer-address-determining step 219 are included in the determination of the second relative component address PAM. The second relative component address describes a memory address in the memory area of the second data element GB of the second component BM relative to the second relative memory address RGB1 of the second data sub-element GB1.

Furthermore, in a sixth pointer-address-determining step 233, a second relative pointer partial address PMBX is determined based on the first relative pointer partial address PAMX, the second relative pointer address PBR, and the second relative component address PBM. The second relative pointer partial address PBMX refers to a memory location in the memory area of the second data element GB relative to the second relative component address PBM. Within the memory area of the second data element GB, the second relative pointer partial address PBMX describes a memory address corresponding to the memory address within the memory area of the first data element GA referenced by the first pointer element Z1. The second relative pointer partial address PBMX describes a memory address within the memory area of the second component BM within the memory area of the second data element GB. In the case that the first pointer element Z1 references the first memory location of the first component AM, the second relative pointer partial address PBMX results in the value 0.

Based on the second relative pointer partial address PBMX, the second relative component address PBM, the second relative memory address RPGB1 of the second data sub-element GB1, and the absolute memory address of the first memory location SPGB of the second data element GB, an absolute memory address within the memory area of the second component BM referenced by the second pointer element Z2 is determined in the first address-determining step 209. The determined memory address in the memory area of the second component BM referenced by the second pointer element Z2 corresponds to the memory address in the memory area of the first data element GA referenced by the first pointer element Z1 within the memory area of the second data element GB.

The absolute memory address within the memory area of the second component BM determined in the first address-determining step 209 is stored in the second pointer element Z2 in the first pointer-storing step 211 as the memory address of the second pointer object ZO2 to be referenced.

In the third case in which the first data sub-element GA1 and the second data sub-element GB1 are of a field type data type and the first data sub-element GA1 comprises a plurality of first elements AE and the second data sub-element GB1 comprises a plurality of second elements BE, at least a first element AE and a second element BE of which are associated with each other via a fourth relation R4, a first relative element address PAE of the first element AE referenced by the first time element Z1 is determined in a first element-address-determining step 225. The first relative element address PAE writes a memory address in the memory area of the first data element GA of the referenced first element AE relative to first relative memory address RGA1 of the first data sub-element GA1. For a description of the first relative element address PAE, please refer to FIG. 7 and the corresponding descriptive section.

In order to determine the first relative element address PAE, a first element size SAE of the first elements AE of the first data sub-element GA1 is determined in an element-size-determining step 229. Here, the first element size SAE describes a memory area that is occupied by a first element AE. Based on the determined first element size SAE and the first relative pointer address PAR, the first element AE referenced by the first pointer element Z1 is identified.

Furthermore, in a seventh pointer-address-determining step 235, a third relative pointer partial address PAEX is determined based on the relative pointer address PAR and the first relative element address PAE. The third relative pointer partial address PAEX describes a memory address referenced by the first pointer element Z1 within the memory area of the first element AE. If a first memory location of the first element AE is referenced by the first pointer element Z1, the first relative pointer partial address PAMX results in the value 0.

Furthermore, in a second element-address-determining step 227, a second relative element address PBE of the second element BE is determined based on the first relative element address PAE. The second relative element address PBE describes a memory address of the second element BE associated with the first element AE referenced by the first pointer element Z1 via the fourth relation R4 in the memory area of the second data element GB. The second relative element address PBE includes the second relative memory address RGB1 of the second data sub-element GB1 determined in the second pointer-address-determining step 215 and the second relative pointer address PBR determined in the fourth pointer-address-determining step 219.

Moreover, in an eighth pointer-address-determining step 237, a fourth relative pointer partial address PBEX is determined on the basis of the third relative pointer partial address PAEX, the second relative pointer address PBR, and the second relative element address PBE. The fourth relative pointer partial address PBEX describes a memory address within the memory area of the second data element GB that is within a memory area of the second element BE. The memory address described by the fourth relative pointer partial address PBEX corresponds, in the memory area of the second data element GB, to the memory address referenced by the first pointer element Z1 in the memory area of the first data element GA.

Further, based on the fourth relative pointer partial address PBEX, the second relative element address PBE, the second relative memory address RGB1, the second data sub-element GB1, and the absolute memory address of the first memory location SPGB of the second data element GB, an absolute memory address is determined that, in the second memory location SPB, corresponds to the memory address referenced by the first pointer element Z1 in the first memory location SPA.

In a fourth case, a second pointer-identifying step 245 identifies a third pointer element Z3 that is not included in either the first data element GA or the second data element GB. Thus, the third pointer element Z3 is neither an object of the first data element GA nor of the second data element GB. The third pointer element Z3 is thus not an object of the first control program A and not an object of the second control program B. The third pointer element Z3 may e.g. be stored in another memory area of the memory SP and be an object of another program.

The third pointer element Z3 references a third pointer object ZO3. The third pointer object ZO3 is an object of the first data element GA and is stored in the memory area of the first data element GA. For example, the third pointer object ZO3 may be a first data sub-element GA1 or a first component AM or, respectively, a first element AE of a first data sub-element GA1 of the first data element GA. Furthermore, the second data element GB comprises an object associated with the third pointer object ZO3. For example, this may be a second data sub-element GB1 or a second component BM or a second element BE of a second data sub-element GB1 and be associated with the third pointer object ZO3 via a corresponding second relation R2, third relation R3 or fourth relation R4.

After identifying the third pointer element Z3, a memory address of the object of the second data element GB associated with the third pointer object ZO3 is determined in a second address-determining step 247. Depending on whether the third pointer object ZO3 is a first data sub-element GA1, a first component AM, or a first element AE, and thus whether the object of the second data element GB associated with the third pointer object ZO3 is a second data subobject GB1, a second component BM, or a second element BE, the memory address of the object of the second data element GB associated with the third pointer object ZO3 is determined according to the steps described above for determining a memory address of a referenced second data sub-object GB1, a referenced second component BM or a referenced second element BE. The information determined in the first address-determining step 209 is taken into account in the second address-determining step 247.

Furthermore, in a third pointer-storing step 249, the determined memory address of the object of the second data element GB associated with the third pointer object ZO3 is stored as a value in the third pointer element Z3. This ensures that the third pointer element Z3 references the object of the second data element GB associated with the third pointer object ZO3 after successful data migration.

In a fifth case, a first pointer element Z1 that is an object of the first data element GA references a first pointer object ZO1 that is neither an object of the first data element GA nor an object of the second data element GB. Thus, the first pointer object ZO1 may be stored in a different memory area of the memory SP. The first pointer object ZO1 is thus not an object of the first control program A or of the second control program B. Furthermore, the second data element GB comprises a second pointer element Z2, which is associated with the first pointer element Z1 via a first relation R1.

In an object-verifying step 239, it is verified whether the first pointer object ZO1 is an object of the first data element GA. In the event that it is determined in the object-verifying step 239 that the first pointer object ZO1 is an object of the first data element GA, the method is performed according to the steps described above.

If, on the other hand, the object-verifying step 239 identifies that the first pointer object ZO1 is not an object of the first data element GA, the second pointer object ZO2 of the second pointer element Z2 is identified as the first pointer object ZO1 in a third object-identifying step 241. The second pointer object ZO2 is thus equated with the first pointer object ZO1. Since the first pointer object ZO1 is not an element of the first data element GA, the first pointer object ZO1 does not have to be migrated during a data migration of the first data element GA to the second data element GB, and the first pointer object ZO1 remains unaffected by the data migration and retains its original value. In the course of the data migration of the first data element GA to the second data element GB, however, it has to be ensured that the second pointer element Z2 associated with the first pointer element Z1 via the first relation R1 references the first pointer object ZO1 after successful data migration. This is achieved by equating the first pointer object ZO1 with the second pointer object ZO2.

In a second pointer-storing step 243, the value of the first pointer element Z1 comprising the memory address of the first pointer object ZO1 is stored in the second pointer element Z2. At the time of executing the method 200, the memory address of the first pointer object ZO1 is known and remains unchanged by the data migration, so that a time-consuming determination of the memory address of the second pointer object ZO2 is omitted and the memory address of the first pointer object ZO1 may be adopted unchanged.

In addition to the pointer migration step 203 described with the preceding explanation, the method 200 further comprises a function-generating step 251. In the function-generating step 251, a first pointer migration function ZMIG1 is generated, which is configured to map the first pointer element Z1 to the second pointer element Z2 according to the method steps indicated in the pointer migration step 203. Furthermore, in the function-generating step 251, a second pointer migration function ZMIG2 is generated, which is configured to perform the second address-determining step 247 and the third pointer-storing step 249 for storing the storage address of the object of the second data element GB associated with the third pointer object ZO3 in the third pointer element Z3.

Moreover, the function-generating step 251 comprises a type-identifying step 253 in which a pointer type of the first pointer element Z1 and a pointer type of the second pointer element Z2 or a pointer type of the third pointer element Z3 are identified. On the basis of the identified pointer types of the first pointer element Z1, the second pointer element Z2, or the third pointer element Z3, the first pointer migration function ZMIG1 and the second pointer migration function ZMIG2 are generated, respectively. The first pointer migration function ZMIG1 and the second pointer migration function ZMIG2 are not limited to a migration of a specific first pointer element Z1, to a specific second pointer element Z2, or to a data migration of a specific third pointer element Z3, respectively, but are set up to map arbitrary pointer elements of the respective identified pointer types to one another. The generated pointer migration functions may map any number of pointer elements of the identified pointer types to one another. For data migration of multiple pointer elements, the generated pointer functions may be accessed any number of times in succession.

In a first verifying step 255, a check is carried out as to whether the first pointer migration function ZMIG1 and the second pointer migration function ZMIG2 could be generated in the second function-generating step 251. If the first pointer migration function ZMIG1 could not be generated, the second pointer element Z2 may be set to an initial value in an initializing step 257. This may be used to ensure that the second pointer element Z2 may still be provided with a valid numerical value despite failed data migration of the first pointer element Z1.

Alternatively, if the generation of the first pointer migration function fails in a terminating step 259, migration of the first pointer element Z1 to the second pointer element Z2 may be aborted. This may be advantageous if control of the automation system 100 on the basis of the second control program B considering the second data element GB for a second pointer element Z2 set to an initial value would result in a malfunction.

In addition to the function-generating step 251, the method 200 further comprises a generating step 263 of generating a first migration function MIG1 for mapping the first data element GA to the second data element GB. By executing the first migration function MIG1, the value of the first data element GA describing the global state of the first control program A and the automation system 100 controlled by the first control program A may be transferred to the second data element GB. The generating step 263 further includes an identifying step 265 of identifying a data type of the first data element GA and a data type of the second data element GB. The first migration function MIG1 is generated based on the identified data types of the first data element GA and the second data element GB. Thus, the first migration function MIG1 is not limited to mapping a first data element GA to a specific second data element GB, but is arranged to map any data of the data type of the first data element GA to any data of the data type of the second data element GB.

After successfully generating the first migration function MIG1 by the generating step 263, the first data element GA may be mapped to the second data element GB in a migration step 261 by executing the first migration function MIG1, and thus a data migration of the global state of the first control program A stored in the first data element GA and of the automation system 100 controlled by the first control program A may be mapped to the second data element GB. After successful data migration of the first data element GA to the second data element GB, the automation system 100 may be controlled on the basis of the second control program B, taking into account the second data element GB. After successful data migration, the second control program B may thus access the transferred numerical values of the objects of the first data element GA by accessing the corresponding objects of the second data element GB.

The data migration of the first data element GA to the second data element GB comprises the above-described data migration of the first pointer elements Z1 of the first data element GA to the second pointer elements Z2 of the second data element GB and/or the data migration of a third pointer element Z3 according to the method steps of the pointer migration step 203.

If a first pointer migration function ZMIG1 could not be generated in the function-generating step 251, a corresponding second pointer element Z2 in the second data element GB may be provided with an initial value initialized in the initializing step 257 after successful data migration of the first data element GA to the second data element GB.

Figure 5:
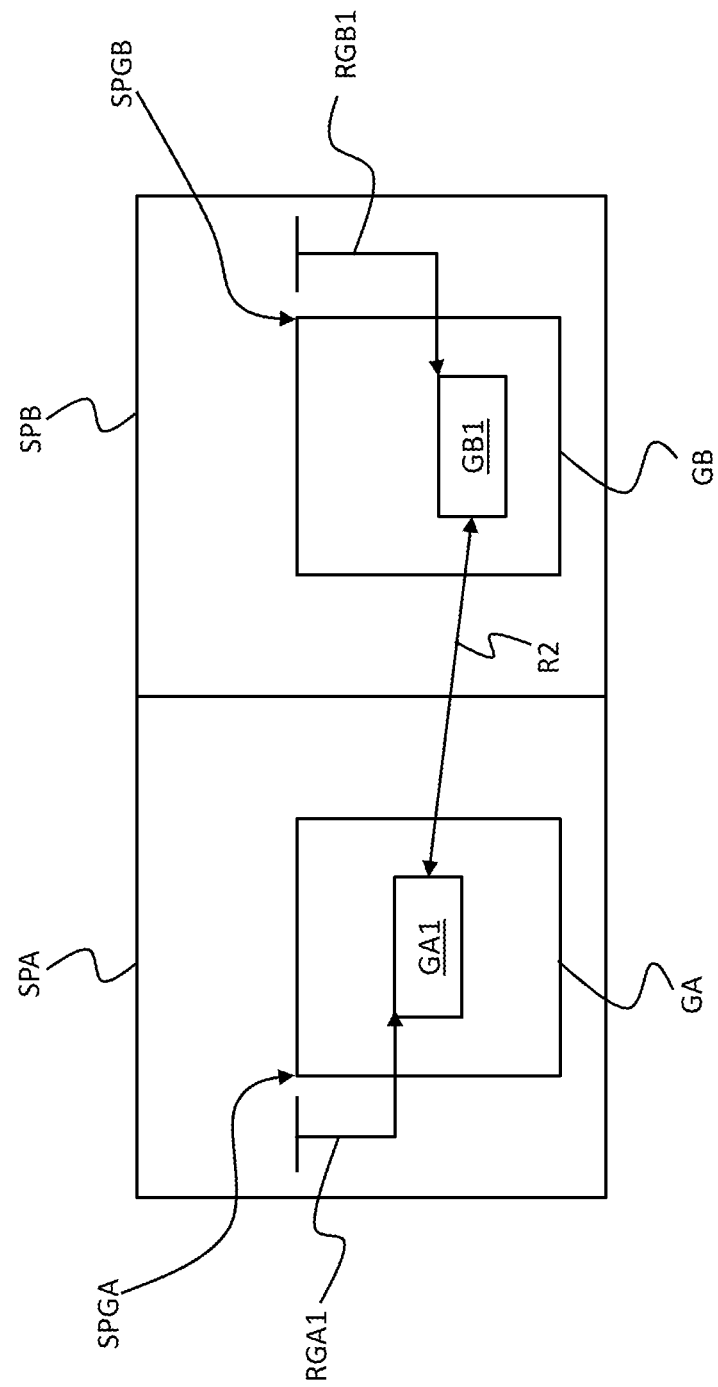
FIG. 5 is a schematic depiction of a determination of a memory address of a pointer object in a data migration of a pointer element in an automation system according to an example.

FIG. 5 shows a schematic diagram for determining a memory address of a pointer object in a data migration of a pointer element in an automation system 100 according to an example.

Figure 6:
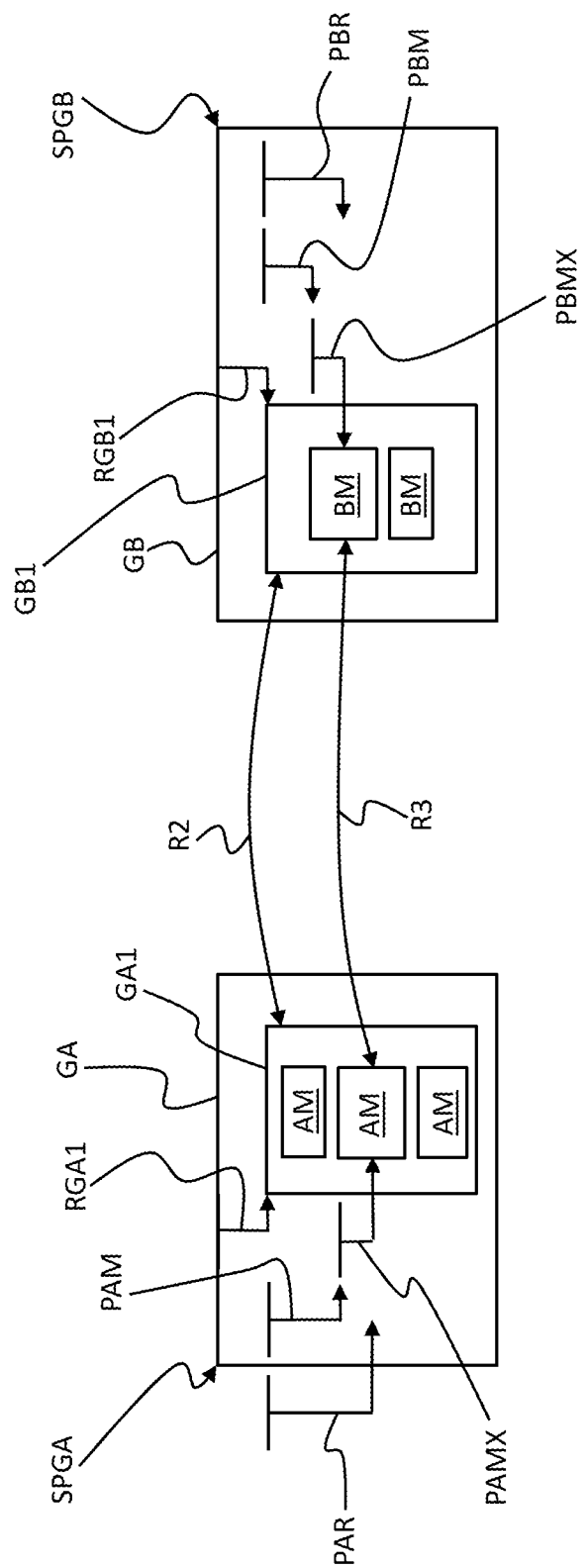
FIG. 6 is a schematic depiction of a determination of a memory address of a pointer object in a data migration of a pointer element in an automation system according to a further example.
Figure 7:
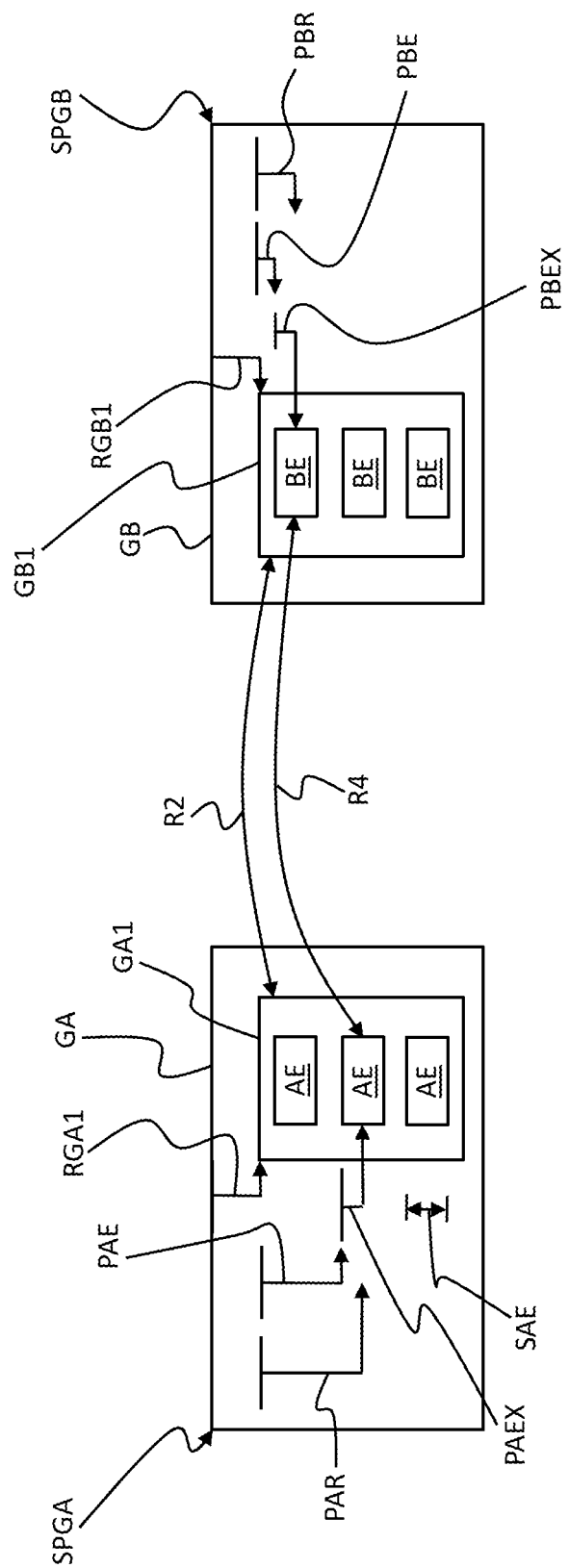
FIG. 7 is a schematic depiction of a determination of a memory address of a pointer object in a data migration of a pointer element in an automation system according to a further example.

FIGS. 5 to 7 serve to illustrate the values determined in the pointer migration step 203 for better understanding. FIGS. 5 to 7 schematically show memory areas of the memory SP in which data objects are stored. The size of the data objects shown represents a memory area occupied by the respective data object. Objects that are depicted to be larger thus occupy a larger memory area. Individual memory locations are within the occupied memory area. A first memory location of a memory area occupied by an object is in each case located at an upper edge of the displayed object. The objects shown each occupy a contiguous memory area without gaps in the memory SP.

FIG. 5 shows the first memory area SPA and the second memory area SPB of memory SP. In the first memory area SPA the first data element GA is shown. The second memory area SPB shows the second data element GB. Both the first data element GA and the second data element GB are shown as contiguous data structures, each occupying a contiguous memory area in the first memory area SPA and the second memory area SPB. The first data element GA comprises a first data sub-element GA1 arranged in the memory area of the first data element GA. The second data element GB comprises a second data sub-element GB1 arranged in the memory area of the second data element GB. The memory area of the first data element GA starts at a first memory location SPGA of the first data element GA. The memory area of the second data element GB starts at a first memory location SPGB of the second data element GB. The first data sub-element GA1 is arranged in a contiguous region within the memory area of the first data element GA and has an offset with regard to the first memory location SPGA of the first data element GA. In FIG. 5, a first relative memory address RGA1 of the first data sub-element GA1 is further shown. The first relative memory address RGA1 of the first data sub-element GA1 describes a distance in the memory area between the first memory location SPGA of the first data element GA and the first memory location of the memory area occupied by the first data sub-element GA1, which is represented by the illustrated arrow. The first relative memory address RGA1 of the first data sub-element GA1 corresponds to the offset of the first data sub-element GA1.

Analogously, the second data element GB has a first memory location SPGB of the second data element GB. The second data sub-element GB1 is stored in a contiguous memory area within the memory area of the second data element GB. The first data sub-element GB1 analogously has an offset with regard to the first memory location SPGB of the second data element GB. A second relative memory address RGB1 of the second data sub-element GB1 describes a distance in the memory area between the first memory location SPGB of the second data element GB and a first memory location of the second data sub-element GB1, which is represented by the marked arrow. The second relative memory address RGB1 of the second data sub-element GB1 corresponds to the offset of the second data sub-element GB1. The first data sub-element GA1 and the second data sub-element GB1 each have a different offset with regard to the first memory location SPGA of the first data element GA and from the first memory location SPGB of the second data element GB.

FIG. 6 shows a schematic diagram of a determination of a memory address of a pointer object in a data migration of a pointer element in an automation system 100 according to another example.

In FIG. 6, the first data sub-element GA1 is of a composite type and has three first components AM stored in the memory area of the first data sub-element GA1. The second data sub-element GB1 is also of a composite type and comprises two second components BM stored in the memory area of the second data sub-element GB1. The first data sub-element GA1 and the second data sub-element GB1 are associated with each other via the second relation R2. The first components AM of the first data sub-element GA1 each have a differing size and occupy a memory area of differing size in the memory area of the first data sub-element GA1. The two second components BM of the second data sub-element GB1 also have differing sizes and occupy memory areas of differing sizes in the memory area of the second data sub-element GB1. A first component AM of the first data sub-element GA1 and a second component BM of the second data sub-element GB1 are associated with each other via a third relation R3.

FIG. 6 further shows a first relative pointer address PAR. The first relative pointer address PAR marks a memory location in the memory area of the first component AM of the first data sub-element GA1 referenced by the first pointer element Z1 relative to the first relative memory address RGA1 of the first data sub-element GA1. In FIG. 6, the first component AM referenced by the first pointer element Z1 is the middle one of the three first components AM shown.

The first relative pointer address PAR identifies the distance in the memory area between the first relative memory address RGA1 of the first data sub-element GA1 to the referenced memory location within the memory area of the referenced first component AM.

Furthermore, a first relative component address PAM is shown describing a distance in memory space between the first relative memory address RGA1 of the first data sub-element GA1 and the first memory location of the referenced first component AM. In addition, a first relative pointer partial address PAMX is shown describing a distance in the memory area between the first memory location of the referenced first component AM to the memory address referenced by the first pointer element Z1 in the memory area of the referenced first component AM. The first relative pointer address PAR results from a sum of the first relative component address PAM and the first relative pointer partial address PAMX.

Furthermore, a second relative pointer address PBR is shown in FIG. 6, which describes a distance between the second relative memory address RGB1 of the second data sub-element GB1 and the referenced memory location in the memory area of the referenced second component BM. Furthermore, a second relative component address PBM is shown describing a distance in the memory area between the second relative memory address RGB1 of the second data sub-element GB1 and a first memory location of the referenced second component BM. Moreover, a second relative pointer partial address PBMX is shown describing a distance between the first memory location of the second component BM and the memory address referenced by the second relative pointer address PBR in the memory area of the referenced second component BM. The second relative pointer address PBR results from a sum of the second relative component address PBM and the second relative pointer partial address PBMX.

Within the memory area of the first data element GA, the memory location in the memory area of the referenced first component AM identified by the first relative pointer address PAR corresponds to the memory location in the memory area of the referenced second component BM identified by the second relative pointer address PBR in the memory area of the second data element GB.

FIG. 7 shows a schematic diagram of a determination of a memory address of a pointer object in a data migration of a pointer element in an automation system 100 according to another example.

In FIG. 7, the first data sub-element GA1 and the second data sub-element GB1 are each embodied as a field type. The first data sub-element GA1 comprises three first elements AE, and the second data sub-element GB1 also comprises three second elements BE. The first data sub-element GA1 and the second data sub-element GB1 are associated with each other via a second relation R2. A first element AE of the first data sub-element GA1 and a second element BE of the second data sub-element GB1 are associated with each other via a fourth relation R4.

Each of the first elements AE shown comprises a first element size SAE that describes a size of the memory area occupied by the first element AE. In FIG. 7, all first elements AE shown have an identical first element size SAE.

In FIG. 7, the first relative pointer address PAR identifies a memory location within the memory area of the first element AE referenced by a first pointer element Z1. The first relative pointer address PAR results from the sum of a first relative element address PAE, which describes a distance in the memory area between the first relative memory address RGA1 of the first data sub-element GA1 and a first memory location of the referenced first element AE, and a third relative pointer partial address PAEX, which describes a distance in the memory area between the first memory location of the referenced first element AE and the memory location in the memory area of the referenced first element AE referenced by the first relative pointer address PAR.

Analogously, a second relative pointer address PBR, a second relative element address PBE and a fourth relative pointer partial address PBEX are shown. The second relative pointer address PBR results from a sum of the second relative element address PBR and the fourth relative pointer partial address PBEX. The memory location referenced by the first relative pointer address PAR in the memory area of the referenced first element AE corresponds, in the memory area of the first data element GA, to the memory location referenced by the second pointer address PBR in the memory area of the referenced second element BE in the memory area of the second data element GB.

The first relative pointer address PAR and the first element size SAE may be used to determine the first element AE referenced by the first pointer element Z1, and the referenced first element AE results from the relation PAR/SAE+ 1. Via the fourth relation R4, the associated second element BE results from the determined first element AE. By determining the second relative pointer address PBR, the memory address within the memory area of the second element BE associated via the fourth relation R4 may be determined, which corresponds to the memory address referenced by the first relative pointer address PAR in the memory area of the first element AE referenced by the first pointer element Z1.

The examples described for FIGS. 5 to 7 are for illustrative purposes only. Deviations with regard to the number and example of the objects shown are included.

Figure 8:
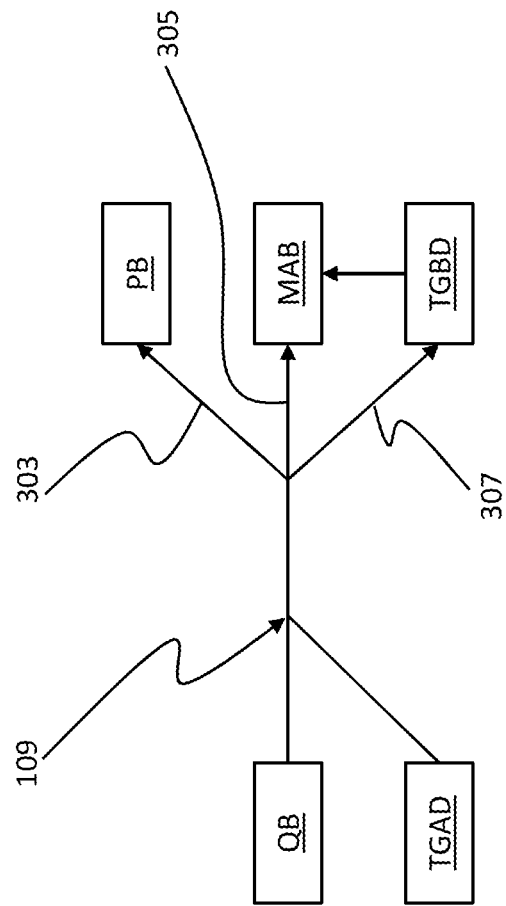
FIG. 8 is a schematic depiction of a generating process of an updated version of a control program of an automation system according to an example.

FIG. 8 shows a schematic depiction of a generating process of a second control program B as an updated version of a first control program A of an automation system 100 according to an example.

According to the example shown in FIG. 8, to generate the second control program B as an updated version of the first control program A, the compiler module 109 considers a source code QB of the second control program B. In a translation step 303 of the compilation process, the compiler module 109 translates the source code QB of the second control program B into an executable code PB of the second control program B that may be executed by the controller 101 of the automation system 100 to control the automation system 100 based on the second control program B.

In the compilation process, the compiler module 109 further takes a definition of the first data type TGAD into account. In the definition of the first data type TGAD of the first data element GA, the first data type of the first data element GA as well as all data types of all first data sub-elements GA1, of all first components AM, of all first elements AE of all first data sub-elements GA1 of the first data element GA are defined. Moreover, all pointer types of all first pointer elements Z1 in the first data element GA are defined in the definition of the first data type TGAD. The definition of the first data type TGAD thus includes all data types or pointer types of all objects of the first data element GA.

Moreover, in the compilation process the compiler module 109 generates a definition of the second data type TGBD from the source code QB of the second control program B in a second generating step 307. Analogously to the definition of the first data type TGAD, the definition of the second data type TGBD comprises the data type of the second data element GB as well as all data types of all second data sub-elements GB1, all second components MB, all second elements BE, and all pointer types of all second pointer elements Z2 of the second data element GB. In analogy to the definition of the first data type TGAD, the definition of the second data type TGBD comprises all data types and pointer types of all objects of the second data element GB.

Further, in the compilation process the compiler module 109 generates a migration code MAB in a first generating step 305. The migration code MAB comprises all first, second, third, and fourth migration functions used for data migration of the first data element GA, the first data sub-elements GA1, the first components AM, and/or the first elements AE to the second data element GB, the second data sub-elements GB1, the second components BM, and/or the second elements AE. Furthermore, the migration code MAB comprises all first pointer migration functions and second pointer migration functions required for mapping the first pointer elements to the second pointer elements and for migrating the third pointer elements, respectively. In order to perform the first generating step 305, which includes the function-generating step 251 and the generating step 263, the compiler module 109 takes the definition of the first data type TGAD and the definition of the second data type TGBD generated in the second generating step 307 into account.

On the basis of the definition of the first data type TGAD and the second data type TGBA, the compiler module 109 generates the migration functions in the generating step 263 and the pointer migration functions in the function-generating step 251.

Figure 9A:
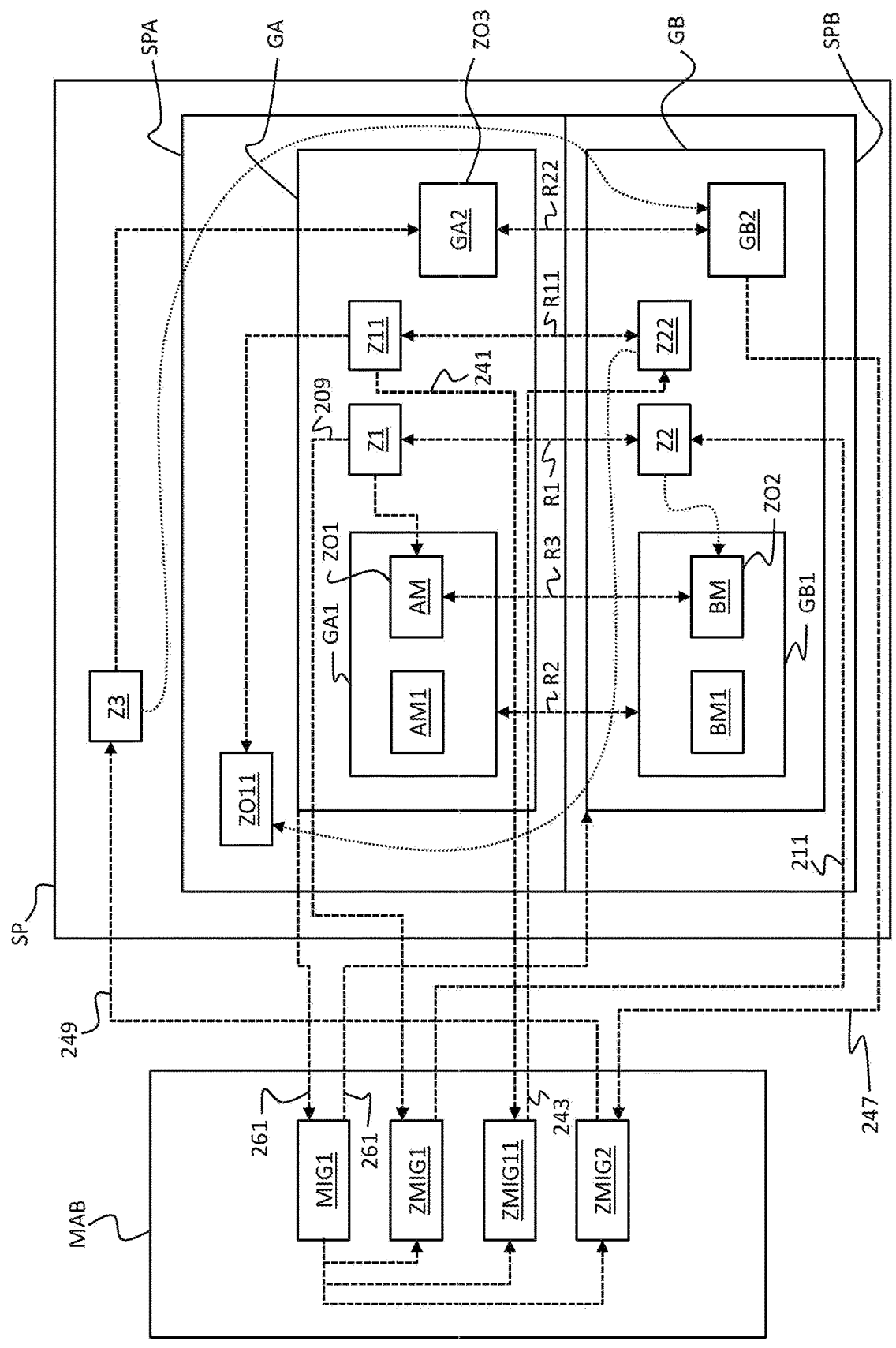
FIG. 9A is a schematic depiction of a migration process of pointer elements of a control program of an automation system according to an example.

FIG. 9 shows a schematic depiction of a migration process of pointer elements of a control program A of an automation system 100 according to a further example.

FIG. 9 depicts an allocation of the individual migration functions and pointer migration functions to the respective objects to be migrated. FIG. 9 also schematizes a migration process of the first data element GA to the second data element GB including a data migration from the first pointer elements Z1 of the first data element GA to the second pointer elements Z2 of the second data element GB.

FIG. 9 shows the first memory area SPA and the second memory area SPB of memory SP. The first memory area SPA stores the first data element GA. The first data element GA comprises a first data sub-element GA1 and another first data sub-element GA2. The first data sub-element GA1 is embodied as a composite type and comprises a first component AM and a further first component AM1. Moreover, the first data element GA comprises a first pointer element Z1 and a further first pointer element Z11.

The second memory area SPB stores the second data element GB. The second memory element GB comprises a second data sub-element GB1, which is of a composite type and comprises a second component BM and a further second component BM1. The second data element GB further comprises a further second data sub-element GB2. Furthermore, the second data element GB comprises a second pointer element Z2 and a further second pointer element Z22.

The first data sub-element GA1 and the second data sub-element GB1 are associated with each other via a second relation R2. The first component AM of the first data sub-element GA1 and the second component BM of the second data sub-element GB1 are associated with each other via a third relation R3. The first pointer element Z1 is associated with the second pointer element Z2 via a first relation R1. The further first pointer element Z11 is associated with the further second pointer element Z22 via a further first relation R11. The further first data sub-element GA2 is associated with the further second data sub-element GB2 via a further second relation R22.

The first pointer element Z1 references the first component AM of the first data sub-element GA1 as a first pointer object ZO1. In the first memory area SPA, a further first pointer object ZO11 is further arranged, which is referenced by the further first pointer element Z11. In the memory SP outside the first memory area SPA and the second memory area SPB, a third pointer element Z3 is further arranged which references the further first data sub-element GA2 of the first data element GA as a third pointer object ZO3.

Furthermore, FIG. 9 shows a migration code MAB comprising a first migration function MIG1, a first pointer migration function ZMIG1, another first pointer migration function ZMIG11, and a second pointer migration function ZMIG2.

For data migration of the first data element GA, the first migration function MIG1 is executed in migration step 261. Here, the first migration function MIG1 reads out the value of the first data element GA in the first memory area SPA and stores the read value in the second memory area SPB in the second data element GB.

In the course of the data migration of the first data element GA to the second data element GB, the first pointer element Z1 is mapped to the second pointer element Z2, the further first pointer element Z11 is mapped to the further second pointer element Z22, and the third pointer element Z3 is migrated.

In order to map the first pointer element Z1 referencing the first component AM of the first data sub-element GA1, the first pointer migration function ZMIG1 executes the first address-determining step 209 and determines the memory address of the second component BM associated via the third relation R3 with the first component AM of the first data sub-element GA1 referenced by the first pointer element Z1. After determining the memory address of the second component BM of the second data sub-element GB1, the first pointer migration function ZMIG1 stores the determined memory address in the second pointer element Z2 associated with the first pointer element Z1 via the first relation R1 in the first pointer-storing step 211. This maps the value of the first pointer element Z1 to the second pointer element Z2, and the second pointer element Z2 references the second component BM, which corresponds to the first component AM referenced by the first pointer element Z1.

The referencing of a first pointer object ZO1 by a first pointer element Z1 is indicated by a dashed arrow. The referencing of a second pointer object ZO2 by a second pointer element Z2, which was generated after successful migration of the respective pointer element, is indicated by a dotted arrow.

For data migration of the further first pointer element Z11 to the further second pointer element Z22, the further first pointer migration function ZMIG11 executes the third object-identifying step 241 and determines the further first pointer object ZO11 referenced by the further first pointer element Z11. The further first pointer object ZO11 is not an object of the first data element GA and is stored outside of the memory area of the first data element GA in the first memory area SPA. For data migration of the further first pointer element Z11, the further first pointer migration function ZMIG11 performs, in the third object-identifying step 241, an identification of the further first pointer object ZO11 referenced by the further first pointer element Z11 as a further second pointer object ZO22 of the further second pointer element Z22. Subsequently, in a second pointer-storing step 243, the further first pointer migration function ZMIG11 stores the determined memory address of the further first pointer object ZO11 as the memory address of the further second memory object ZO22 in the further second pointer element Z22. This ensures that after successful data migration the further first pointer object ZO11 stored in the first memory area SPA is referenced by the further second pointer element ZO22.

For data migration of the third pointer element Z3, which is stored outside the first memory area SPA and the second memory area SPB in the memory SP, the second pointer migration function ZMIG2 executes the second address-determining step 247 and determines the memory address of the further second data sub-element GB2, which is associated with the further first data sub-element GA2 via the further second relation R22, the further first data sub-element GA2 being referenced by the third pointer element Z3 as third pointer object ZO3. After determining the memory address of the further second data sub-element GB2, the second pointer migration function ZMIG2 executes the third pointer-storing step 249 and stores the determined memory address of the further second data sub-element GB2 in the third pointer element Z3. Hereby, after successful data migration, the third pointer element Z3 references the further second data sub-element GB2, which corresponds to the further first data element GA2 according to the further second relation R22.

To perform data migration of the first data element GA to the second data element GB by the first migration function MIG1, the first migration function MIG1 may successively access the first pointer migration function ZMIG1, the further first pointer migration function ZMIG11, or the second pointer migration function ZMIG2 to map the corresponding pointer elements to each other.

As an alternative to the example shown in FIG. 9, a plurality of first pointer migration functions ZMIG1 and a plurality of second pointer migration functions ZMIG2, respectively, may be used for data migration of a plurality of first pointer elements, second pointer elements, and third pointer elements, which may be accessed one after the other to carry out data migration. Moreover, the first pointer migration function ZMIG1 or the second pointer migration function ZMIG2 may comprise a plurality of pointer migration sub-functions configured to execute the individual method steps within the pointer migration step 203 and e.g. to determine the first relative pointer address PAR, the second relative pointer address PBR, the first relative component address PAM, the second relative component address PBM, the first relative pointer partial address PAMX, the second relative pointer partial address PBMX, the first relative memory address RGA1, or the second relative memory address RGB1. The individual pointer migration sub-functions may be accessed by the first pointer migration function ZMIG1 or the second pointer migration function ZMIG2 to carry out the respective process steps.

In order to achieve a complete data migration of the first data element GA to the second data element GB, the first migration function MIG1 may further access second migration functions MIG2, third migration functions MIG 3 and fourth migration functions MIG4 to respectively map first data sub-elements GA1 to second data sub-element GB1, first components AM to second components BM and first elements AE to second elements BE. For the sake of clarity of FIG. 9, there are further migration functions.

The method 200 may be applied to a first data element GA and a second data element GB, each describing global states of the first control program A and the second control program B and each having a plurality of objects. The objects of the first data element GA may be of compound types, field types, scalar types, or pointer types, and each may have a complex data structure. Objects of compound type may in turn have a plurality of components, which may in turn be of compound type, field type, scalar type, or pointer type, and may in turn optionally have components or elements. A nesting depth is not limited by the method 200.

Similarly, the objects of the second data element GA may be of composite types, field types, scalar types, or pointer types, and each may optionally have a complex data structure. Objects of the compound type may in turn have a plurality of components, which may in turn be of the compound type, the field type, the scalar type, or the pointer type, and may in turn optionally comprise components or elements. A nesting depth is not limited by the method 200.

The method 200 may be used recursively.

For data migration of a first pointer element Z1 of the first data element GA to a second pointer element Z2 of the second data element GB, the first pointer object ZO1 referenced by the first pointer element Z1 is identified. The first pointer object ZO1 may be any object of the first data element GA1. In particular, the first pointer object ZO1 has a correspondence in an object of the second data element GB1 and is associated with this object via a corresponding relation. The aim of the method 200 is to determine the absolute memory address of this object of the second data element GB1 and to write it to the second pointer element Z2, so that referencing of the respective object by the second pointer element Z2 is allowed for.

At the point in time of performing the data migration, the absolute address of the object of the second data element GB1 is not known, since the second data element GB1 is stored in the second memory area SPB as a contiguous unit, without more detailed knowledge about the absolute memory addresses of the objects of the second data element GB1. However, the first memory location of the second data element GB1 is known, which is the first absolute memory address of the memory area occupied by the second data element GB1 in the second memory area SPB.

Furthermore, an internal structure of the second data element GB1 is known, which describes how the individual objects are arranged within the second data element GB1.

In order to determine the absolute address of the object of the second data element GB1 associated with the first pointer object ZO1, a relative address of the first pointer object ZO1 is determined. The relative address of the first pointer object allows for locating the first pointer object ZO1 within the first data element GA1. On the basis of the relative address of the first pointer object ZO1, a relative address of the object of the second data element GB1 associated with the first pointer object ZO1 is determined, wherein the relative address of the object of the second data element GB1 associated with the first pointer object ZO1 allows for locating the object in the second data element GB1.

On the basis of the relative address of the object of the second data element GB1 associated with the first pointer object ZO1, an absolute address of the object of the second data element GB1 is subsequently determined, taking into account the first memory location of the second data element GB1. This absolute address is then used as the address for referencing the object by the second pointer element Z2 as the second pointer object ZO2.

Referenced objects may be of any data type, as described above.

For data migration of a plurality of pointer elements, the method 200 may be executed several times.

This invention has been described with respect to exemplary examples. It is understood that changes can be made and equivalents can be substituted to adapt these disclosures to different materials and situations, while remaining with the scope of the invention. The invention is thus not limited to the particular examples that are disclosed, but encompasses all the examples that fall within the scope of the claims.

TABLE 1

List of Reference Symbols

| | |
|---|---|
| A First control program | Z1 First pointer element |
| PA First executable code | Z11 Further first pointer element |
| MAB Migration code | ZO1 First pointer object |
| SPS Memory | ZO11 Further first pointer object |
| SPA First memory area | Z2 Second pointer element |
| GA First data element | Z22 Further second pointer element |

TABLE 1-continued

List of Reference Symbols

| | |
|---|---|
| TGAD Definition of first data type | ZO2 Second pointer object |
| GA1 First data sub-element | Z3 Third pointer element |
| GA2 Further first data sub-element | ZO3 Third pointer object |
| AM First component | RGA1 First relative memory address |
| AM1 Further first component | RGB1 Second relative memory address |
| AE First element | PAR First relative pointer address |
| BE Second element | PBR Second relative pointer address |
| B Second control program | PAM First relative component address |
| QB Source text of second control program | PBM Second relative component address |
| PB Second executable code | PAMX First relative pointer partial address |
| SPB Second memory area | PBMX Second relative pointer partial address |
| GB Second data element | SAE First element size |
| GB1 Second data sub-element | PAEX Third relative pointer partial address |
| GB2 Further second data sub-element | PBEX Fourth relative pointer partial address |
| BM Second component | SPGA First memory location of first data element |
| BM1 Further second component element | SPGB First memory location of second data |
| R1 First relation | ZMIG First pointer migration function |
| R11 Further first relation | ZMIG11 Further first pointer migration function |
| R2 Second relation | ZMIG2 Second pointer migration function |
| R22 Further second relation | MIG1 First migration function |
| R3 Third relation | |
| R4 Fourth relation | |

TABLE 2

List of Reference Numerals

| | |
|---|---|
| 100 Automation system | 231 Fifth pointer-address-determining step |
| 101 Controller | 233 Sixth pointer-address-determining step |
| 103 Master subscriber | 235 Seventh pointer-address-determining step |
| 105 Slave subscriber | 237 Eighth pointer-address-determining step |
| 107 Bus system | 239 Object-verifying step |
| 109 Compiler module | 241 Third object-identifying step |
| 200 Method | 243 Second pointer-storing step |
| 201 First pointer-identifying step | 245 Second pointer-identifying step |
| 202 Replacing step | 247 Second address-determining step |
| 203 Pointer migration step | 249 Third pointer-storing step |
| 205 First object-identifying step | 251 Function-generating step |
| 207 Second object-identifying step | 253 Type-identifying step |
| 209 First address-determining step | 255 First verifying step |
| 211 First pointer-storing step | 257 Initializing step |
| 213 First pointer-address-determining step | 259 Terminating step |
| 215 Second pointer-address-determining step | 261 Migration step |
| 217 Third pointer-address-determining step | 263 Generating step |
| 219 Fourth pointer-address-determining step | 265 Identifying step |
| 221 First component-address-determining step | 303 Translation step |
| 223 Second component-address-determining step | 305 First generating step |
| 225 First element-address-determining step | 307 Second generating step |
| 227 Second element-address-determining step | |
| 229 Element-size-determining step | |

The invention claimed is:

1. A method for data migration of a pointer element in the course of data migration of a program state of a control program of an automation system,
wherein a controller of the automation system comprises a first control program and a second control program,
wherein the first control program comprises a first data element which describes a program state of the first control program and comprises at least a first pointer element of a first pointer type referencing a first pointer object,
wherein the second control program comprises a second data element which describes a program state of the second control program and comprises at least a second pointer element of a second pointer type which is configured to reference a second pointer object, and
wherein the first data element is stored in a first memory area and the second data element is stored in a second memory area of the controller;
wherein the method comprises:
identifying the first pointer element and the second pointer element as pointer elements associated with each other via a first relation in a first pointer-identifying step, wherein the first relation implies that the first pointer element and the second pointer element each have identical functions in the first control program and in the second control program, and
mapping the first pointer element to the second pointer element in a pointer migration step, the pointer migration step comprising:
identifying the first pointer object referenced by the first pointer element in a first object-identifying step,
identifying an object associated with the first pointer object as the second pointer object in a second object-identifying step,
determining a memory address of the second pointer object in a first address-determining step, and
writing the determined memory address of the second pointer object as a value of the second pointer element into the second pointer element in a first pointer-storing step.

2. The method according to claim 1,
wherein the first data element comprises at least a first data sub-element,
wherein the second data element comprises at least a second data sub-element associated with the first data sub-element via a second relation,
wherein the first data sub-element corresponds to the first pointer object and is referenced by the first pointer element, wherein the second data sub-element corresponds to the second pointer object, and
wherein the pointer migration step comprises:
determining a first relative memory address of the first data sub-element in a first pointer-address-determining step, wherein a memory address of the first data sub-element within a memory area of the first data element relative to a first memory location of the first data element is described by the first relative memory address,
determining a second relative memory address of the second data sub-element in a second pointer-address-determining step, wherein a memory address of the second data sub-element within a memory area of the second data element relative to a first memory location of the second data element is described by the second relative memory address, and
determining an absolute memory address of the second data sub-element on the basis of the second relative memory address of the second data sub-element and the first memory location of the second data element in the first address-determining step.

3. The method according to claim 2, wherein the pointer migration step comprises:
determining a first relative pointer address of the first pointer element in a third pointer-address-determining step, wherein a memory location referenced by the first pointer element within the memory area of the first data element relative to the first relative memory address of the first data sub-element is described by the first relative pointer address of the first pointer element,
determining, on the basis of the first relative pointer address, a second relative pointer address of the second pointer element in a fourth pointer-address-determining step, wherein a memory location within the memory area of the second data element relative to the second relative memory address of the second data sub-element is determined by the second relative pointer address of the second pointer element, and wherein the second relative pointer address in relation to the second data sub-element corresponds to the first relative pointer address in relation to the first data sub-element, and
determining an absolute memory address of the second data sub-element on the basis of the second relative pointer address, the second relative memory address of the second data sub-element, and the first memory location of the second data element in the second memory area in the first address-determining step.

4. The method according to claim 3, wherein the pointer migration step comprises:
if the first data sub-element and the second data sub-element are each of a composite type, if the first data sub-element comprises at least one first component, if the second data sub-element comprises at least one second component, if the first component and the second component are associated via a third relation, and if the first component is referenced by the first pointer element,
determining a first relative component address of the first component on the basis of the first relative pointer address in a first component-address-determining step, wherein a memory address in the memory area of the first data element of the first component relative to the first relative memory address of the first data sub-element is described by the first relative component address,
determining a second relative component address of the second component of the second data sub-element on the basis of the first relative component address in a second component-address-determining step, wherein the second relative component address describes a memory address in the memory area of the second data element of the second component relative to the second relative memory address of the second data sub-element, and
determining an absolute memory address of the second component of the second data sub-element on the basis of the second relative component address, the second relative memory address of the second data sub-element, and the first memory location of the second data element in the second memory area in the first address-determining step.

5. The method according to claim 3, wherein the pointer migration step comprises:
- if the first data sub-element and the second data sub-element are each of a field type, wherein the field types have the same number of dimensions, if the first data sub-element comprises a plurality of first elements and the second data sub-element comprises a plurality of second elements, if at least a first element and a second element are associated via a fourth relation, and if the first element is referenced by the first pointer element,
- determining a first relative element address of the first element referenced by the first pointer element in a first element-address-determining step, wherein the first relative element address describes a memory address in the memory area of the first data element of the first element referenced by the first pointer element relative to the first relative memory address of the first data sub-element,
- determining, on the basis of the first relative element address, a second relative element address of a second element associated with the first element referenced by the first pointer element via the fourth relation, in a second element-address-determining step, wherein the second relative element address describes a memory address of said second element in said second memory area relative to said second relative memory address of said second data sub-element, and
- determining an absolute memory address of the second element of the second data sub-element on the basis of the second relative element address, the second relative memory address of the second data sub-element, and the first memory location of the second data element in the second memory area in the first address-determining step.

6. The method according to claim 5, wherein the first element-address-determining step comprises:
- determining a first element size of the first elements of the first data sub-element in an element-size-determining step, wherein the first element size of a first element corresponds to a memory space occupied by the first element in the memory area of the first data element, and
- determining the first element referenced by the first pointer element based on the first relative pointer address and the first element size.

7. The method according to claim 4, wherein the pointer migration step comprises:
- determining, on the basis of the first relative pointer address and the first relative component address, a first relative pointer partial address in a fifth pointer-address-determining step, wherein, via the first relative pointer partial address, the memory location in the first memory area referenced by the first pointer element is described relative to the first relative component address of the first component of the first data sub-element,
- determining, on the basis of the first relative pointer partial address, the second relative pointer address, and the second relative component address, a second relative pointer partial address in a sixth pointer-address-determining step, wherein a memory location in the memory area of the second data element is determined relative to the second relative component address by the second relative pointer partial address, and wherein the second relative pointer partial address in relation to the second data sub-element corresponds to the first relative pointer partial address in relation to the first data sub-element, and
- determining an absolute memory address of the second component of the second data sub-element on the basis of the second relative pointer partial address, the second relative component address, the second relative memory address of the second data sub-element, and the first memory location of the second data element in the memory area of the second data element in the first address-determining step.

8. The method according to claim 5, wherein the pointer migration step comprises:
- determining, on the basis of the first relative pointer address and the first relative element address, a third relative pointer partial address in a seventh pointer-address-determining step, wherein the memory location referenced by the first pointer element relative to the first relative element address of the first element of the first data sub-element is described by the third relative pointer partial address,
- determining, on the basis of the third relative pointer partial address and the second relative element address, a fourth relative pointer partial address in an eighth pointer-address-determining step, wherein a memory location in the memory area of the second data element relative to the second relative element address is determined by the fourth relative pointer partial address, and wherein the fourth relative pointer partial address in relation to the second data sub-element corresponds to the third relative pointer partial address in relation to the first data sub-element, and
- determining an absolute memory address of the second element of the second data sub-element on the basis of the fourth relative pointer partial address, the second relative element address, the second relative pointer address, the second relative memory address of the second data sub-element, and the first memory location of the second data element in the second memory area in the first address-determining step.

9. The method according to claim 1, further comprising:
- verifying whether the first pointer object is comprised by the first data element in an object-verifying step,
- if the first pointer object is not comprised by the first data element, identifying the second pointer object as the first pointer object in a third object-identifying step, and
- writing the value of the first pointer element to the second pointer element in a second pointer-storing step.

10. The method according to claim 1, wherein the pointer migration step comprises:
- identifying a third pointer element in a second pointer-identifying step, wherein the third pointer element is not comprised by either the first data element or the second data element, and wherein the third pointer element references a third pointer object comprised by the first data element, wherein the third pointer object is a first data sub-object, a first component or a first element, and wherein the third pointer object is associated with a second data sub-object, a second component or a second element via a second relation, a third relation or a fourth relation, determining an absolute memory address of the second data sub-element associated with the third pointer object, the second component associated with the third pointer object, or the second element associated with the third pointer object in the second memory area in a second address-determining step, and writing the absolute memory address of the second data sub-element associated with the third pointer object, the second component associated with the third pointer object, or the second element associated with the third pointer object as the value of the third pointer element in a third pointer-storing step.

11. A method according to claim 1, further comprising:
generating a first pointer migration function for mapping the first pointer element to the second pointer element in a function-generating step,
wherein the first pointer migration function is configured to map a pointer element of the first pointer type to a pointer element of the second pointer type and to execute the pointer migration step.

12. The method according to claim 11, wherein the function-generating step comprises identifying the first pointer type of the first pointer element and the second pointer type of the second pointer element in a type-identifying step.

13. The method according to claim 11, further comprising:
verifying whether the first pointer migration function could be generated in the function-generating step in a first verifying step; and
if in the function-generating step the first pointer migration function could not be generated, setting the second pointer element to an initial value in an initializing step, and/or
if the first pointer migration function could not be generated in the function-generating step, cancelling the migration in a terminating step.

14. The method according to claim 1, wherein the controller further comprises a compiler module for translating a control program, and wherein the function-generating step is performed by the compiler module.

15. The method according to claim 1, further comprising:
mapping the first data element to the second data element and/or mapping the first data sub-element to the second data sub-element and/or mapping the first components to the second components and/or mapping the first elements to the second elements in a migration step; and
executing the second control program and controlling the automation system on the basis of the second control program, taking into account the second data element.

* * * * *